US012209754B2

(12) United States Patent
Ceron et al.

(10) Patent No.: US 12,209,754 B2
(45) Date of Patent: Jan. 28, 2025

(54) LADDER RACK ASSEMBLY FOR A COOKING CAVITY

(71) Applicant: WHIRLPOOL CORPORATION, Benton Harbor, MI (US)

(72) Inventors: Simone Emanuele Ceron, Busto Arsizio (IT); Massimiliano Frontini, Casciago (IT); Marco Giuliani, Comerio (IT); John J. Myers, Saugatuck, MI (US); Roberto J. Hubner, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 841 days.

(21) Appl. No.: 17/342,328

(22) Filed: Jun. 8, 2021

(65) Prior Publication Data

US 2021/0388993 A1 Dec. 16, 2021

Related U.S. Application Data

(60) Provisional application No. 63/037,276, filed on Jun. 10, 2020.

(51) Int. Cl.
*F24C 15/16* (2006.01)
*H05B 6/64* (2006.01)

(52) U.S. Cl.
CPC ........... *F24C 15/16* (2013.01); *H05B 6/6408* (2013.01)

(58) Field of Classification Search
None
See application file for complete search history.

(56) References Cited

U.S. PATENT DOCUMENTS

| | | | | |
|---|---|---|---|---|
| 2,466,360 A * | 4/1949 | Bitney | F24C 15/16 | 126/337 R |
| 2,671,004 A | 3/1954 | Chadwick et al. | | |
| 2,841,132 A * | 7/1958 | Philipp | F24C 15/007 | 126/39 M |
| 3,410,260 A * | 11/1968 | Morgan | F24C 15/16 | 126/19 R |
| 3,454,744 A | 7/1969 | Vonderhaar | | |
| 3,706,302 A * | 12/1972 | Helgeson | F24C 15/007 | 126/39 M |
| 4,140,888 A * | 2/1979 | Baron | H05B 6/6402 | 219/746 |
| 4,307,285 A * | 12/1981 | DeRemer | A47J 37/0635 | 126/39 M |
| 5,651,597 A * | 7/1997 | Oslin | F24C 15/16 | 211/175 |
| 10,551,071 B2 * | 2/2020 | Bianchi | A47L 15/507 | |
| 2007/0284982 A1 | 12/2007 | Brexler et al. | | |

(Continued)

FOREIGN PATENT DOCUMENTS

| | | | |
|---|---|---|---|
| DE | 4243364 A1 * | 6/1994 | F24C 15/16 |
| DE | 102018116219 A1 * | 1/2020 | F24C 15/168 |

(Continued)

*Primary Examiner* — Jorge A Pereiro
(74) *Attorney, Agent, or Firm* — Price Heneveld LLP

(57) ABSTRACT

A cooking appliance includes a cabinet that defines a cooking cavity that has a first sidewall. A ladder rack assembly includes a horizontal rack and a vertical rail that are coupled to the first sidewall. The vertical rail is at least partially disposed within a recess of the first sidewall of the cooking cavity.

15 Claims, 18 Drawing Sheets

(56) References Cited

U.S. PATENT DOCUMENTS

| | | | | |
|---|---|---|---|---|
| 2010/0155552 | A1* | 6/2010 | Mazzetti | F24C 15/16 248/220.21 |
| 2010/0230404 | A1* | 9/2010 | Sigler | A47J 37/0772 219/732 |
| 2012/0138041 | A1 | 6/2012 | Jährling | |
| 2013/0118471 | A1* | 5/2013 | Sprigler | F24C 15/168 126/19 R |

FOREIGN PATENT DOCUMENTS

| | | | |
|---|---|---|---|
| EP | 1757863 | B1 | 10/2018 |
| JP | S5539440 | U | 3/1980 |
| WO | 2012085775 | A2 | 6/2012 |
| WO | 2016034191 | A1 | 3/2016 |

* cited by examiner

LADDER RACK ASSEMBLY FOR A COOKING CAVITY

CROSS-REFERENCE TO RELATED APPLICATIONS

This application claims priority to U.S. Patent Application No. 63/037,276, filed on Jun. 10, 2020, entitled "LADDER RACK ASSEMBLY FOR A COOKING APPLIANCE COOKING CAVITY," the disclosure to which is hereby incorporated herein by reference in its entirety.

BACKGROUND OF THE DISCLOSURE

The present disclosure generally relates to a ladder rack assembly. More specifically, the present disclosure relates to a ladder rack assembly for a cooking cavity of a cooking appliance.

SUMMARY OF THE DISCLOSURE

According to one aspect of the present disclosure, a cooking appliance including a cabinet defining a cooking cavity. The cooking cavity is defined by at least one sidewall. The at least one sidewall defines a recessed region surrounded by a peripheral surface. A ladder rack assembly is disposed within the cooking cavity. The ladder rack assembly includes a horizontal rack defining a cooking level and a vertical rail coupled to the horizontal rack and coupled to the at least one sidewall within the recessed region. The vertical rail is flush with the peripheral surface of the at least one sidewall.

According to another aspect of the present disclosure, a ladder rack assembly for a cooking appliance includes a wall defining a recessed region adjacent to a peripheral surface. An interior surface of the recessed region is offset from the peripheral surface by a predefined depth. A ladder rack is coupled to the interior surface in the recessed region. The ladder rack includes a first vertical rail disposed proximate a first edge of the recessed region, a second vertical rail disposed proximate a second edge of the recessed region, and at least one horizontal rack extending between the first vertical rail and the second vertical rail. The first vertical rail and the second vertical rail are disposed within a space defined by the recessed region and the at least one horizontal rack extends out of the space.

According to yet another aspect of the present disclosure, a ladder rack assembly for a cooking appliance including a first vertical rail and a second vertical rail spaced from the first vertical rail. Each of the first vertical rail and the second vertical rail has a planar inner surface configured to be oriented toward a cooking cavity of said cooking appliance. Horizontal racks are coupled to the planar inner surfaces and extend between the first vertical rail and the second vertical rail. Each horizontal rack has a rectangular cross-sectional shape.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Figure 1:
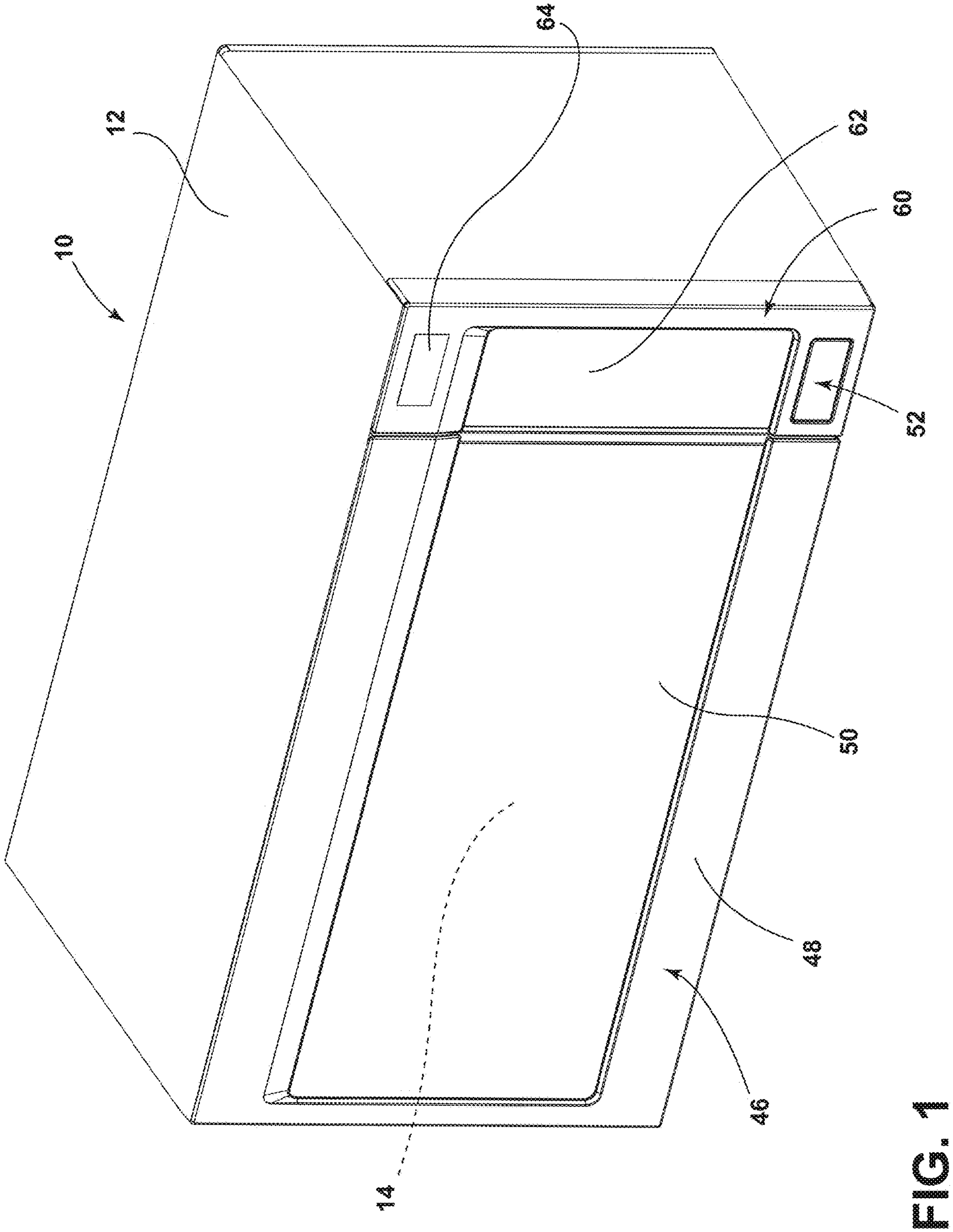
FIG. 1 is a front perspective view of a cooking appliance, according to the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-18, reference numeral 10 generally designates a cooking appliance having a cabinet 12 that defines a cooking cavity 14. The cooking cavity 14 is at least partially defined by at least one sidewall 16. The sidewall 16 includes a recessed region 18 surrounded by a peripheral surface 20. A ladder rack assembly 22 is disposed within the cooking cavity 14. The ladder rack assembly 22 includes horizontal racks 24, 26, 28, 30 defining cooking levels. The ladder rack assembly 22 also includes first and second vertical rails 32, 34 coupled to the horizontal racks 24, 26, 28, 30 and coupled to the sidewall 16 within the recessed region 18. The vertical rails 32, 34 are flush with the peripheral surface 20 of the sidewall 16.

Figure 2:
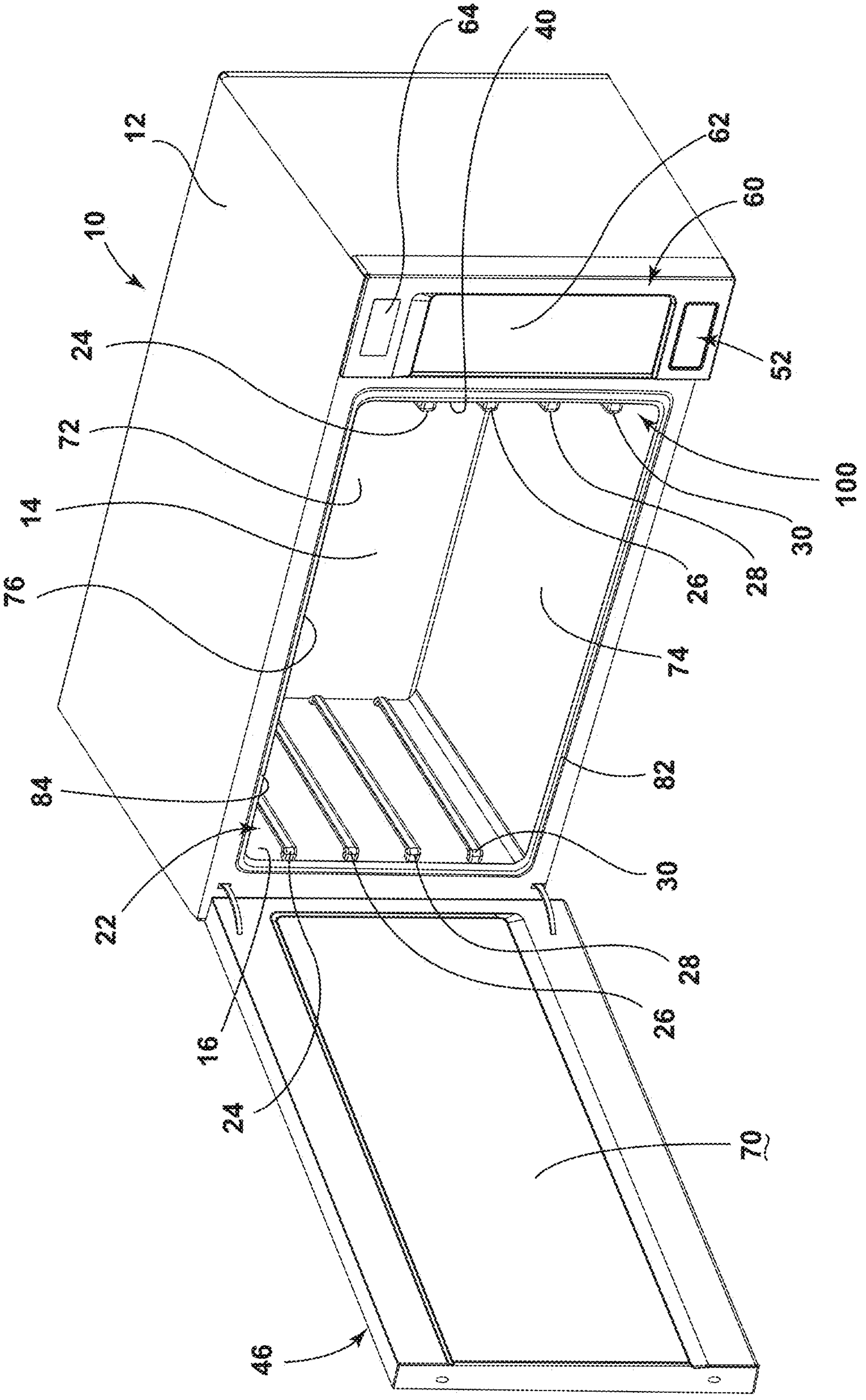
FIG. 2 is a front elevational view of a cooking cavity of a cooking appliance having a ladder rack assembly coupled to each sidewall, according to the present disclosure.

Referring to FIGS. 1 and 2, the cooking appliance 10 is illustrated as a microwave oven, however, the cooking appliance may be a microwave oven, a standard oven, a compact oven, a pyrolytic (self-cleaning) oven, a pure steam oven, or other appliances with cooking cavities 14 without departing from the teachings herein. In each configuration of the cooking appliance 10, the cabinet 12 defines the cooking cavity 14. The cabinet 12 includes two sidewalls 16, 40 that partially define the cooking cavity 14.

A door assembly 46 is rotatably coupled to the cabinet 12. The door assembly 46 is operable between open and closed positions to selectively provide access to and enclose the cooking cavity 14 of the cooking appliance 10. Depending on the configuration of the cooking appliance 10, the door assembly 46 may rotate about a vertical axis, as illustrated, or a horizontal axis. In the illustrated example, the door assembly 46 includes a door frame 48 and a glass panel 50. The glass panel 50 is coupled to, and held in place by, the door frame 48. The glass panel 50 may be at least partially optically transmissive to allow a user of the cooking appliance 10 to view into the cooking cavity 14 before, during, or after operation of the cooking appliance 10. Other configurations of the door assembly 46 may be utilized with the cooking appliance 10 without departing from the teachings herein. The cooking appliance 10 may include a latch assembly 52 for maintaining the door assembly 46 in a closed position and for allowing the user to selectively open the door assembly 46 to access the cooking cavity 14.

The cooking appliance 10 generally includes a control panel 60. The control panel 60 includes a user interface 62, which may include one or more input elements, such as pushbuttons, touch switches, control knobs, and the like for setting operation parameters during use of the cooking appliance 10. The user interface 62 may include one or more display elements 64 for displaying information, such as time, parameter selections, and the like to the user.

Referring still to FIG. 2, when the door assembly 46 is closed, the cooking cavity 14 is partially defined by an interior surface 70 of the door assembly 46. The cooking cavity 14 is further defined by a rear wall 72, a bottom 74, a top 76, and the sidewalls 16, 40. In certain configurations of the cooking appliance 10, the walls 16, 40, 72, the bottom 74, the top 76, and the interior surface 70 of the door assembly 46 may include microwave reflective materials such as galvanized steel or stainless steel to reflect microwaves within the cooking cavity 14 toward items of food to be heated. In additional non-limiting examples, the walls 16, 40, 72, the bottom 74, the top 76, and the interior surface 70 of the door assembly 46 may also, or alternatively, include a coating such as an acrylic enamel coating or a ceramic coating to provide ease of cleaning and/or a desired aesthetic appearance to the cooking cavity 14. The coating may be a substantially non-stick coating, for example, polytetrafluoroethylene (PTFE) or ceramic.

Figure 3:
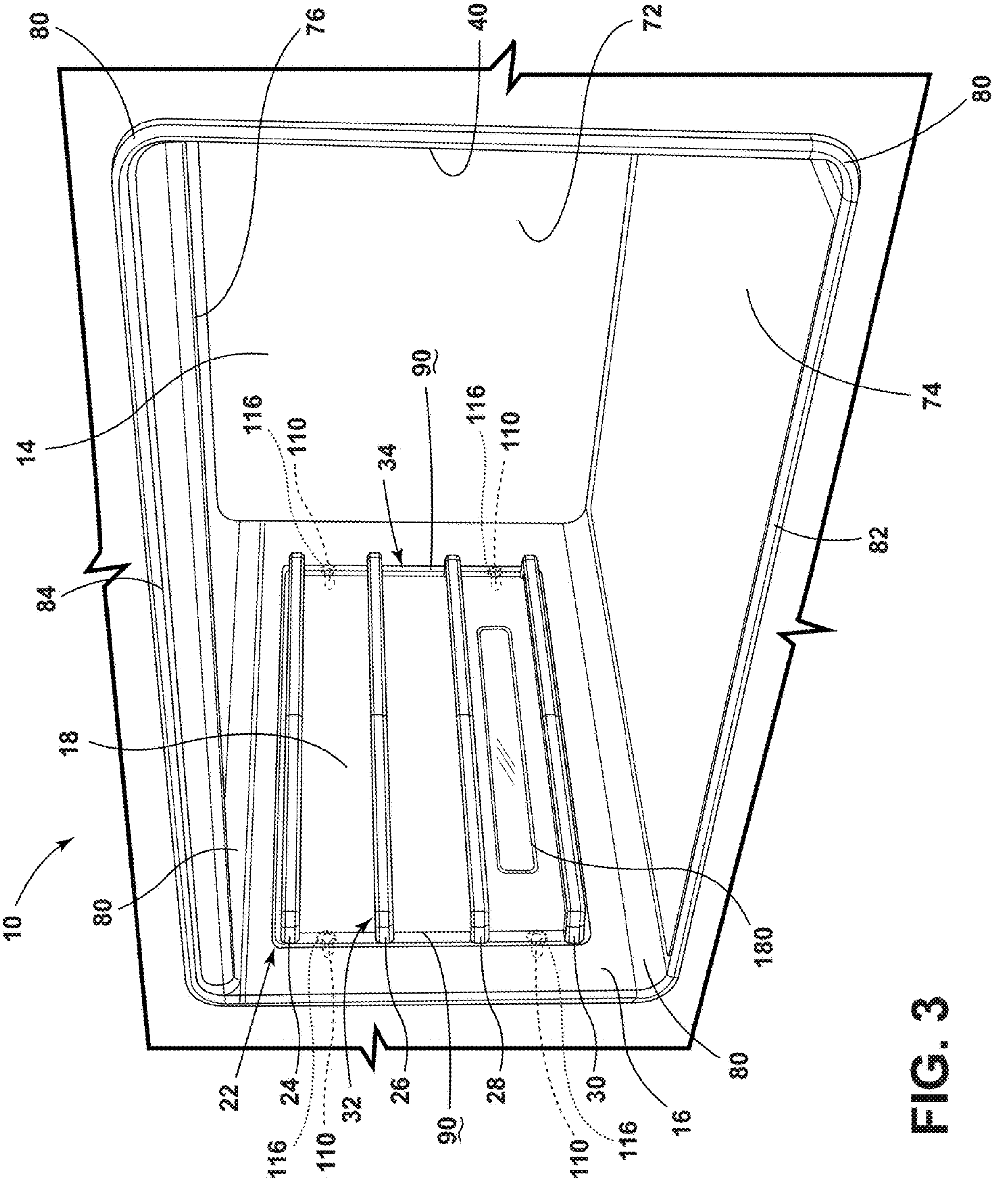
FIG. 3 is a side perspective view of a cooking cavity of a cooking appliance having a ladder rack assembly, according to the present disclosure.

Referring still to FIG. 2, as well as to FIG. 3, in the illustrated example, the cooking cavity 14 may include multiple fillets 80. The fillets 80 couple each of the first sidewall 16 with the top 76, the second sidewall 40 with the top 76, the first sidewall 16 with the bottom 74, and the second sidewall 40 with the bottom 74. Each fillet 80 may help to prevent arcing and/or reduce stress concentrations within the cooking cavity 14. The cooking cavity 14 may further include a rounded periphery 82. The rounded periphery 82 may assist in providing a better seal between the interior surface 70 of the rounded periphery 82 when the door assembly 46 is in a closed position. As illustrated, the cooking cavity 14 further includes a rounded upper edge 84 along a front portion of the cooking cavity 14. The rounded upper edge 84 may help to prevent or reduce discomfort to the user in situations where a hand of the user may come into contact with or slide along the rounded upper edge 84 as food is being placed into or removed from the cooking cavity 14.

Referring still to FIGS. 2 and 3, the cooking cavity 14 includes the ladder rack assembly 22 for receiving a cooking tray or rack on which the items of food may be supported. Further, a plurality of cooking trays may be supported by the ladder rack assembly 22 at any given time. The ladder rack assembly 22 defines multiple cooking levels at different heights within the cooking cavity 14. Different cooking levels may be advantageous for different types of food or for supporting multiple cooking trays simultaneously. Each horizontal rack 24, 26, 28, 30 generally defines a separate cooking level.

The ladder rack assembly 22 includes the vertical rails 32, 34. The vertical rail 32 is a forward rail that is disposed proximate to the door assembly 46 and the vertical rail 34 is disposed proximate to the rear wall 72 of the cooking cavity 14. The vertical rails 32, 34 are generally arranged parallel to one another.

The ladder rack assembly 22 also includes horizontal racks 24, 26, 28, 30 extending between and coupled to the vertical rails 32, 34. The horizontal racks 24, 26, 28, 30 are arranged parallel to one another in a spaced apart configuration along a length of the vertical rails 32, 34, The horizontal racks 24, 26, 28, 30 extend outward from a cavity-facing inner surface 90 of the vertical rail 32, toward the other vertical rail 34, and then inward to the inner surface 90 of the vertical rail 34. In this way, central guide portions 92 of the horizontal racks 24, 26, 28, 30 that support cooking trays are offset from the inner surfaces 90 of the vertical rails 32, 34. In certain aspects, the horizontal racks 24, 26, 28, 30 are integrally formed with the vertical rails 32, 34 such that the ladder rack assembly 22 is a single unitary component.

The ladder rack assembly 22 is configured to couple to the first sidewall 16. A second ladder rack assembly 100 is coupled to the second sidewall 40 such that the cooking tray is supported on each side. The second sidewall 40 and the second ladder rack assembly 100 may include similar or identical characteristics as those described herein with respect to the first sidewall 16 and the ladder rack assembly 22. The ladder rack assembly 100 may be a mirror image of the ladder rack assembly 22. Accordingly, details discussed herein with respect to the ladder rack assembly 22 may also be applied to the ladder rack assembly 100.

Figure 4:
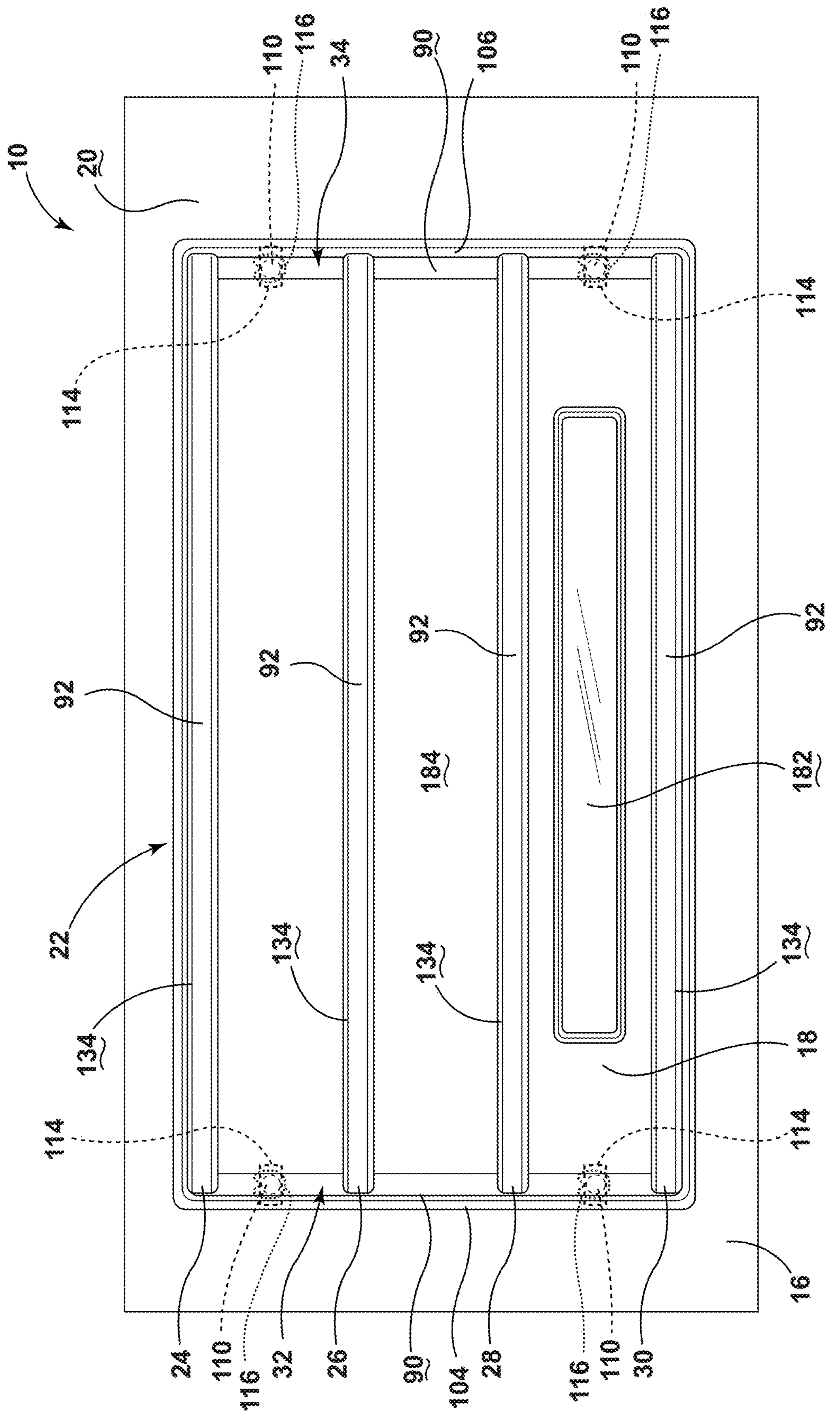
FIG. 4 is a front elevational view of the ladder rack assembly coupled to a first sidewall within the cooking cavity of FIG. 3, according to the present disclosure.

Referring still to FIG. 2, as well as to FIGS. 3 and 4, the first sidewall 16 defines the recessed region 18. The recessed region 18 is generally embossed into the sidewall 16. In certain aspects, the recessed region 18 is centrally located within the sidewall 16. The recessed region 18 is configured to receive at least a portion of the vertical rails 32, 34. The vertical rails 32, 34 may be disposed completely within a space defined by the recessed region 18. It is contemplated that the sidewall 16 may define two recessed regions 18, with one vertical rail 32, 34 disposed in each recessed region 18, without departing from the teachings herein. In such configurations, the recessed regions 18 may be sized and shaped to accommodate the vertical rails 32, 34 with minimal space between the inner surfaces 90 of the vertical rails 32, 34 and the peripheral surface 20.

In various examples, the vertical rails 32, 34 may be disposed adjacent to first and second opposing edges 104, 106 of the recessed region 18. The recessed region 18 is surrounded by the peripheral surface 20. The recessed region 18 is offset from the peripheral surface 20 by a depth d. The vertical rails 32, 34 may have a thickness that is substantially equal to the the depth d. In this way, the inner surfaces 90 of the vertical rails 32, 34 are substantially flush with the planar peripheral surface 20 of the first sidewall 16, such that the vertical rails 32, 34 do not protrude from the first sidewall 16. The peripheral surface 20 and the inner surfaces 90 of the vertical rails 32, 34 may define a generally continuous and planar surface. The vertical rails 32, 34 may then appear to be integrated into the sidewall 16. Additionally or alternatively, the vertical rails 32, 34 may abut the opposing edges 104, 106 to minimize or eliminate a space between the peripheral surface 20 and the inner surfaces 90 of the vertical rails 32, 34. This may provide ease of cleaning of the cooking appliance 10 to the user as food and other grime will be unable to reach an outer portion of the vertical rails 32, 34 abutting the sidewall 16. The inner surfaces 90 of the vertical rails 32, 34 may be substantially planar to provide a smooth transition between the first sidewall 16 and the vertical rails 32, 34 and also to provide more space within the cooking cavity 14.

The horizontal racks 24, 26, 28, 30 are coupled to the vertical rails 32, 34 and extend into the cooking cavity 14 to provide a support surface for the cooking tray. The horizontal racks 24, 26, 28, 30 may be coupled to the vertical rails 32, 34 by welding, adhesive, mechanical fasteners, etc. Alternatively, the vertical rails 32, 34 and the horizontal racks 24, 26, 28, 30, may be integrally formed as a single unitary piece. In another non-limiting example, each horizontal rack 24, 26, 28, 30 may be adjustable along a length of the vertical rails 32, 34. The horizontal racks 24, 26, 28, 30 may lock or clamp at the selected height with the cooking cavity 14, which may be advantageous for adjusting the cooking levels within the cooking appliance 10.

Figure 5:
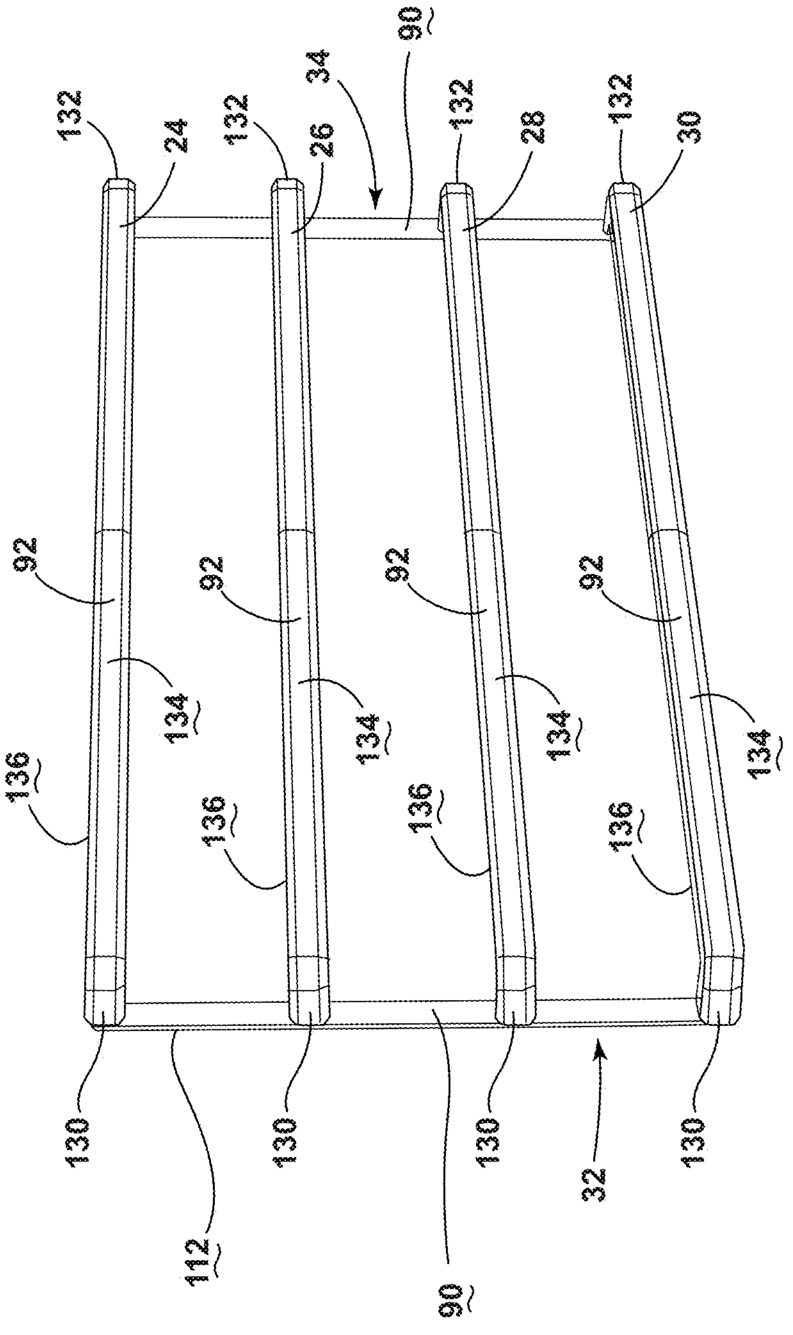
FIG. 5 is a side perspective view of the ladder rack of FIG. 3 separated from the sidewall, according to the present disclosure.

Referring still to FIGS. 3-5, the vertical rails 32, 34 may be coupled to the first sidewall 16 in any of a variety of ways. The vertical rails 32, 34 each include at least one pin 110, which extends from an abutting surface 112 of the vertical rails 32, 34. The abutting surface 112 is oriented away from the cooking cavity 14 and abuts the sidewall 16 when the ladder rack assembly 22 is coupled to the sidewall 16. In the illustrated example, each vertical rail 32, 34 includes two pins 110. The pins 110 are configured to extend through an aperture 114 defined within the recessed region 18 of the first sidewall 16. The pins 110 may include an annular recess configured to at least partially receive a retaining ring 116. The retaining ring 116 is configured to contact an exterior surface of the first sidewall 16 and engage the respective pin 110 to prevent the ladder rack assembly 22 from being removed from the first sidewall 16. The pins 110 may be integrally formed with, and extend laterally outward from, the vertical rails 32, 34. The pins 110 may include a chamfer or fillet that surrounds a periphery of a distal end of the pin 110 to provide ease of assembly as the pin 110 is extended through the aperture 114 defined by the first sidewall 16.

In lieu of, or in addition to, the retaining ring 116, the pins 110 may include a radially extending annular protrusion. At least one of the radially extending annular protrusion and the sidewall 16 defining the aperture 114 may be configured to elastically deform as the pin 110 is pushed through the aperture 114. Accordingly, the pins 110 may function as an annular integral attachment feature (i.e., annular snap-fit feature). The pins 110 may include external threads configured to receive a nut, which may be rotatably fastened thereon and which may engage the exterior surface of the first sidewall 16 to secure the ladder rack assembly 22 to the first sidewall 16.

Alternatively or additionally, the recessed region 18 defined by the first sidewall 16 may be sized such that the vertical rails 32, 34 may be received by press-fitting the vertical rails 32, 34 into the recessed region 18. Other forms of snap-fitting and/or press-fitting are also contemplated. For example, an attachment receiving aperture may be defined on at least one side surface of the opposing edges 104, 106 of the recessed region 18 or the vertical rails 32, 34. In such examples, a cantilevered attachment feature may be defined on the other of the opposing edges 104, 106 or the vertical rails 32, 34. The cantilevered attachment feature may deform or deflect as the vertical rails 32, 34 are inserted into the recessed region 18 and engage the attachment receiving aperture upon insertion of the vertical rails 32, 34 to retain the vertical rails 32, 34 within the recessed region 18. It is also contemplated that each vertical rail 32, 34 may be mechanically connected with fasteners or adhesives.

Figure 6:
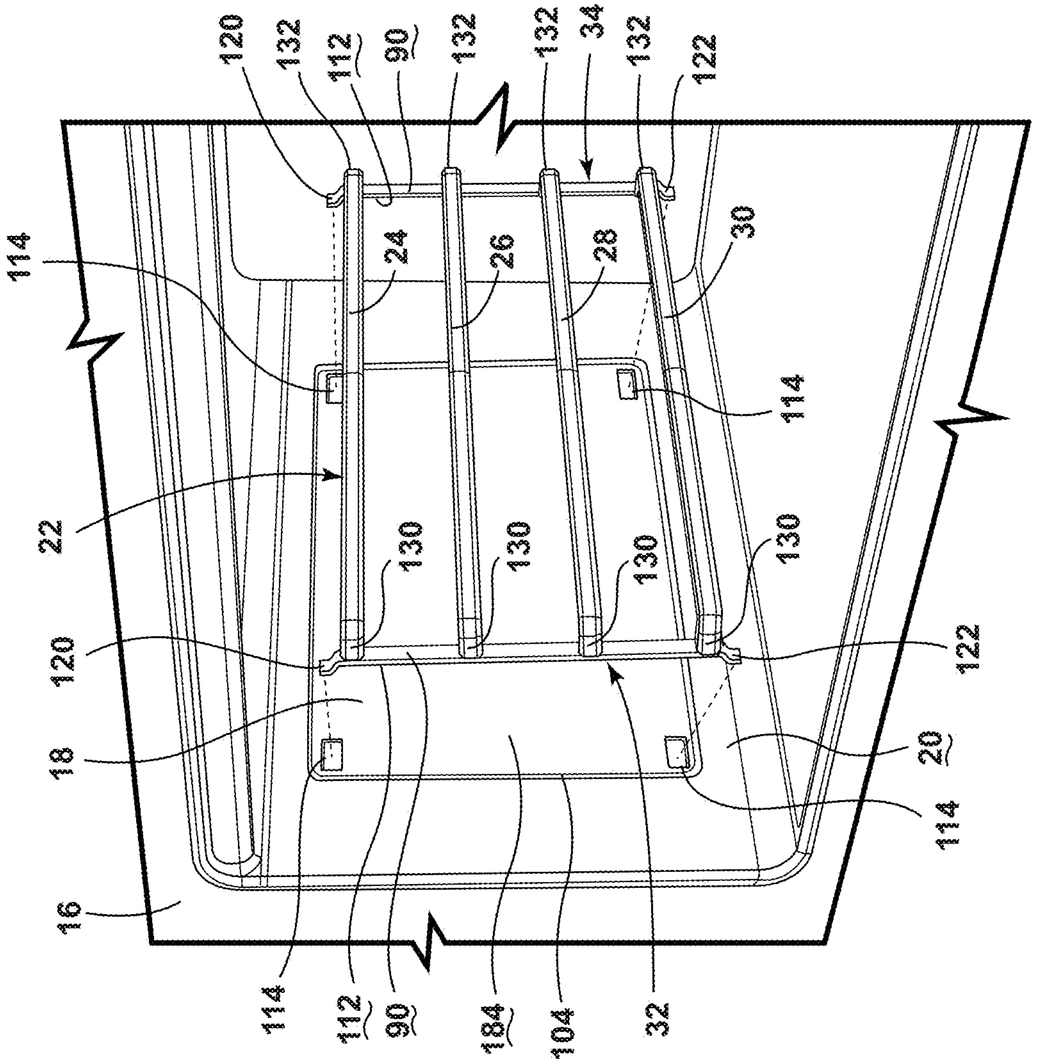
FIG. 6 is an exploded side perspective view of a ladder rack assembly and a sidewall, according to the present disclosure.

Referring to FIG. 6, an additional or alternative coupling method for coupling the ladder rack assembly 22 within the sidewall 16 is illustrated. In such configurations, the sidewall 16 defines multiple apertures 114. Generally, the sidewall 16 defines four apertures, with one aperture 114 being defined proximate to each corner of the recessed region 18. Each vertical rail 32, 34 includes an upper coupling feature 120 and a lower coupling feature 122. The upper and lower coupling features 120, 122 may extend from ends of the vertical rails 32, 34 or, alternatively from the abutting surface 112. The upper and lower coupling features 120, 122 are generally curved extensions that curve away from the horizontal racks 24, 26, 28, 30.

The upper and lower coupling features 120, 122 are configured to extend through the apertures 114 and engage the exterior surface of the sidewall 16. The ladder rack assembly 22 may then be retained to the sidewall 16 through the engagement between the sidewall 16 and the upper and lower coupling features 120, 122. This engagement may reduce movement of the ladder rack assembly 22 relative to the sidewall 16 as well as provide convenient engagement and disengagement between the ladder rack assembly 22 and the sidewall 16. In certain aspects, the upper coupling features 120 may first be inserted through the respective apertures 114. The lower coupling features 122 may then be inserted through the respective apertures 114 to fully couple the ladder rack assembly 22 to the sidewall 16.

Referring again to FIGS. 1-6, in the illustrated configuration, the ladder rack assembly 22 includes a pair of the vertical rails 32, 34 that are substantially similar (i.e., the forward vertical rail 32 and the rearward vertical rail 34) spaced a distance from one another and operably coupled with the first sidewall 16. The vertical rails 32, 34 may extend between the horizontal racks 24, 30 and may extend beyond the horizontal racks 24, 30. As illustrated, the forward vertical rail 32 is substantially parallel to the rearward vertical rail 34. The ladder rack assembly 22 further includes a plurality of the horizontal racks 24, 26, 28, 30, each with a first end 130 coupled to the forward vertical rail 32 and a second end 132 coupled to the rearward vertical rail 34. The ends 130, 132 of the horizontal racks 24, 26, 28, 30 are coupled to the inner surfaces 90 of the forward vertical rail 32 and the rearward vertical rail 34, respectively. The ends 130, 132 extend from the inner surfaces 90 from the vertical rails 32, 34 such that the horizontal racks 24, 26, 28, 30 extend laterally into the cooking cavity 14. As illustrated, each end of the horizontal racks 24, 26, 28, 30 includes a rounded corner between the ends 130, 132 and the guide portions 92. It is contemplated that in the ends 130, 132 of some or all of horizontal racks 24, 26, 28, 30 may extend beyond the vertical rails 32, 34. Additionally, an intermediate vertical rail may be incorporated in a central part of the ladder rack assembly 22 such that a portion of the horizontal racks 24, 26, 28, 30 couple to the intermediate vertical rail.

According to various aspects, a cross-section of the vertical rails 32, 34 may be substantially uniform along the length of the vertical rails 32, 34. Similarly, a cross-section of the horizontal racks 24, 26, 28, 30 may be substantially uniform along the length of the horizontal racks 24, 26, 28, 30. However, it is contemplated that the vertical rails 32, 34 and/or the horizontal racks 24, 26, 28, 30 may include a varied cross-section. For example, the horizontal racks 24, 26, 28, 30 may include a larger cross-section and the ends 130, 132 proximate to the vertical rails 32, 34 than in the guide portion 92 of the horizontal racks 24, 26, 28, 30.

In the illustrated configuration, the horizontal racks 24, 26, 28, 30 extend substantially parallel with the first sidewall 16. However, it is contemplated that the horizontal racks 24, 26, 28, 30 may be angled with respect to the first sidewall 16. For example, the ladder rack may be angled toward the first sidewall 16 and a forward portion of the appliance 10 to provide ease in inserting/removing the cooking tray. It will be understood by a skilled artisan that the number and size of each of the vertical rails 32, 34 and the horizontal racks 24, 26, 28, 30 may vary without departing from the scope of the present disclosure.

Referring still to FIGS. 1-6, the ladder rack assembly 22 may include rounded edges on at least one of the vertical rails 32, 34 and the horizontal racks 24, 26, 28, 30. The rounded edges of the ladder rack assembly 22 provide a more aesthetic appearance as well as help to prevent electrical arcing during operation of the cooking appliance 10. The rounded edges may additionally help to reduce stress concentrations within the ladder rack assembly 22 to help to prevent chipping and/or cracking of the ladder rack assembly 22.

The vertical rails 32, 34 and the horizontal racks 24, 26, 28, 30 may include one or more substantially planar surfaces. For example, each of the abutting surface 112 and the inner surface 90 of each vertical rail 32, 34 may be substantially planar. Additionally, the horizontal racks 24, 26, 28, 30 may each include a first surface 134 on the guide portion 92 oriented toward the interior of the cooking cavity 14 and a second surface 136 that is oriented toward the sidewall 16. The first and/or second surfaces 134, 136 on the guide portions 92 may be substantially planar. The planar surfaces on the ladder rack assembly 22 may be advantageous for the ladder rack assembly 22 to appear more integrated into the sidewall 16 and/or to blend aesthetically into the sidewall 16.

Figure 13:
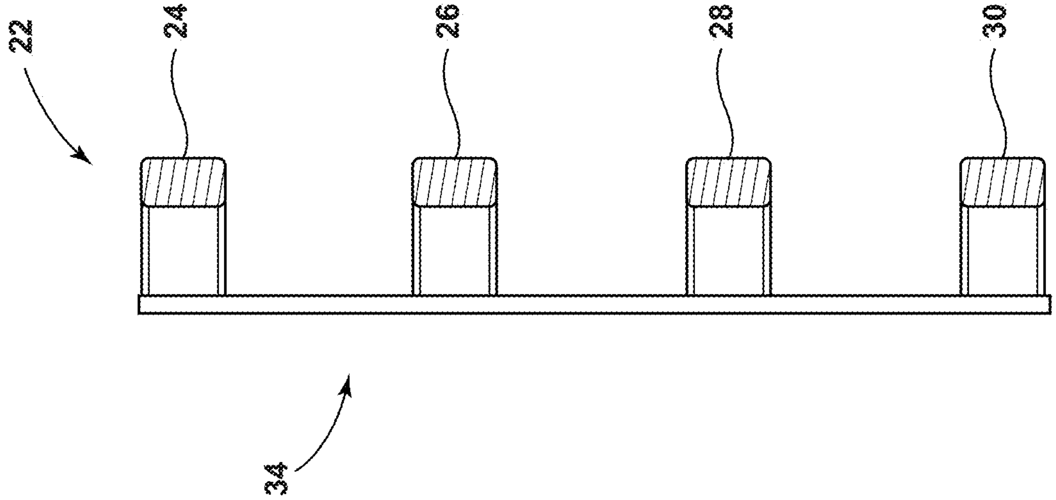
FIG. 13 is a cross-sectional view of a ladder rack assembly, according to the present disclosure.

In various examples, the vertical rails 32, 34 and the horizontal racks 24, 26, 28, 30 each have a substantially rectangular or square cross-sectional shape with radii at the edges that may vary depending on aesthetic proportions. The rectangular cross-section of the vertical rails 32, 34 allow the vertical rails 32, 34 to have a flat appearance and be generally coplanar with the peripheral surface 20. The rectangular cross-section of the horizontal racks 24, 26, 28, 30 provides a more flush and integrated aesthetic for the ladder rack assembly 22 (as best illustrated in FIG. 13). The rectangular cross-sectional shape provides an integrated and seamless appearance of the ladder rack assembly 22 with the sidewall 16.

Figure 14:
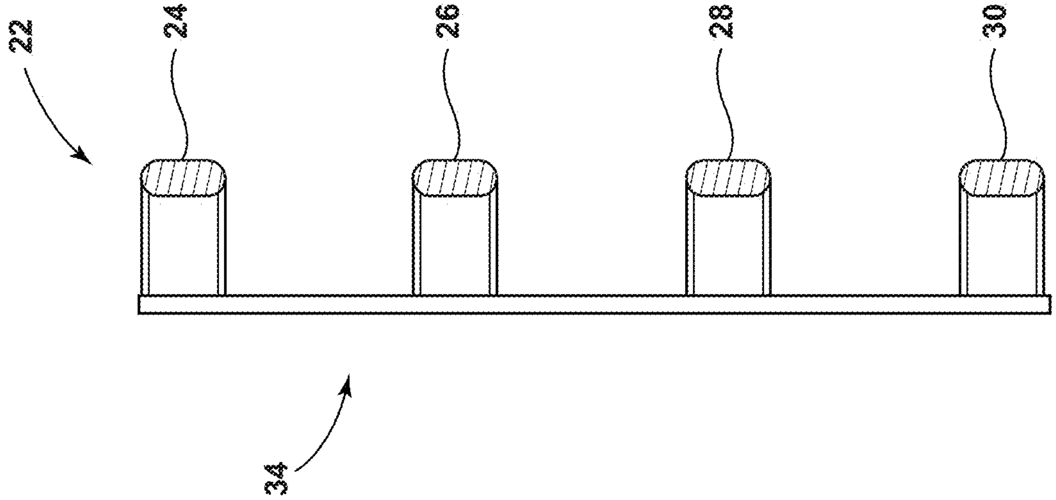
FIG. 14 is an additional cross-sectional view of a ladder rack assembly, according to the present disclosure.

In additional non-limiting examples, one of the vertical rails 32, 34 and the horizontal racks 24, 26, 28, 30 may include one or more substantially planar surfaces and the other of the vertical rails 32, 34 and the horizontal racks 24, 26, 28, 30 may include a substantially oblong, oval, or circular cross-section. For example, the vertical rails 32, 34 may be disposed within the recessed region 18 of the first sidewall 16 and may include a substantially planar surface (e.g., the inner surface 90) flush with the peripheral surface 20 of the first sidewall 16 for ease of cleaning. In such examples, the horizontal racks 24, 26, 28, 30 may include a substantially oblong or oval cross-section (as best illustrated in FIG. 14). The ladder rack assembly 22 may include one or more planar surfaces that include an overlay and/or coating. It is also contemplated that each of the horizontal racks 24, 26, 28, 30 and/or vertical rails 32, 34 may differ from each other to include any variety of the disclosed features or appearances described herein.

Figure 7:
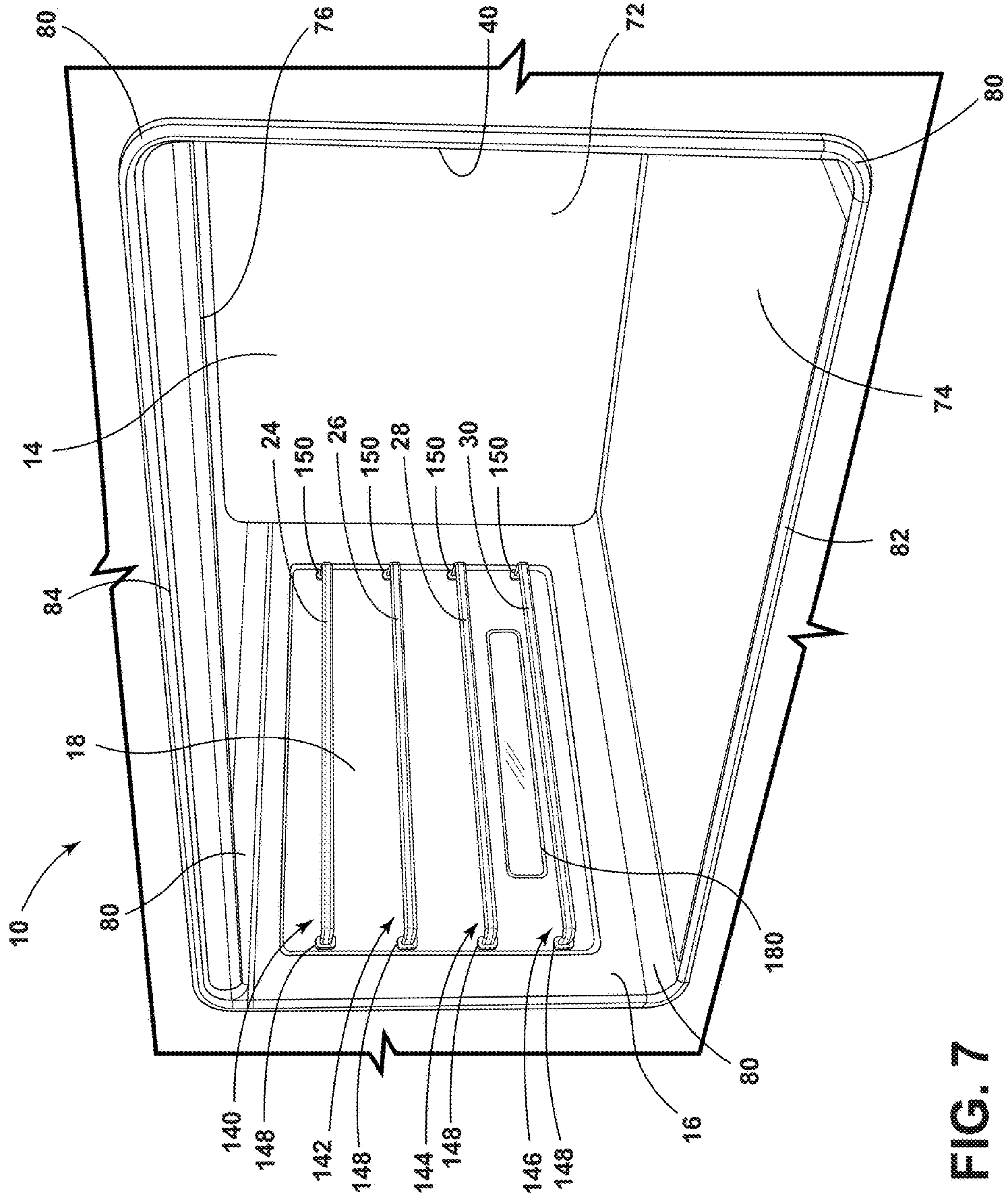
FIG. 7 is a side perspective view of a cooking cavity of a cooking appliance having a ladder rack assembly coupled to a sidewall, according to the present disclosure.
Figure 8:
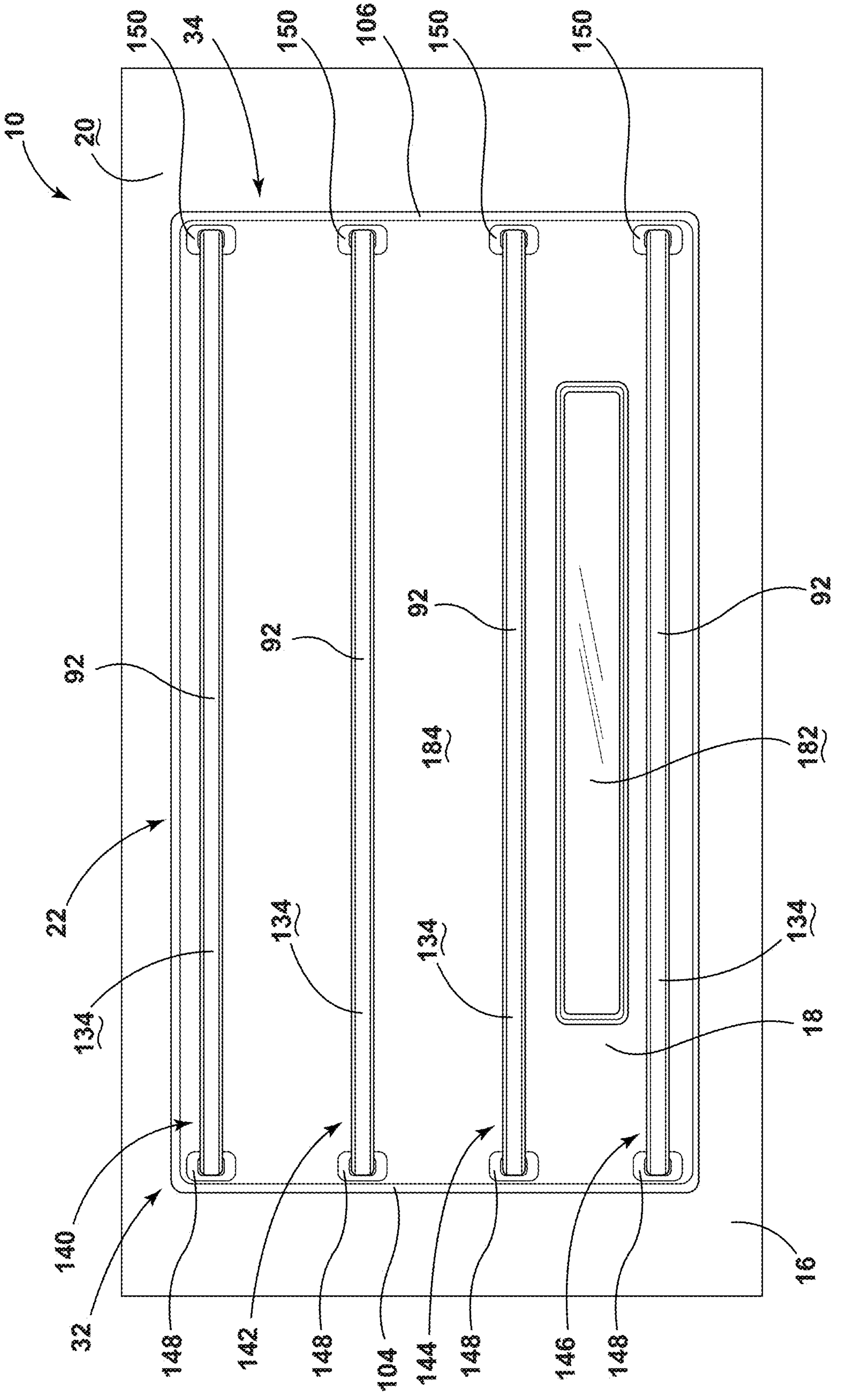
FIG. 8 is a front elevational view of the ladder rack assembly of FIG. 7 coupled to the sidewall within the cooking cavity, according to the present disclosure.
Figure 9:
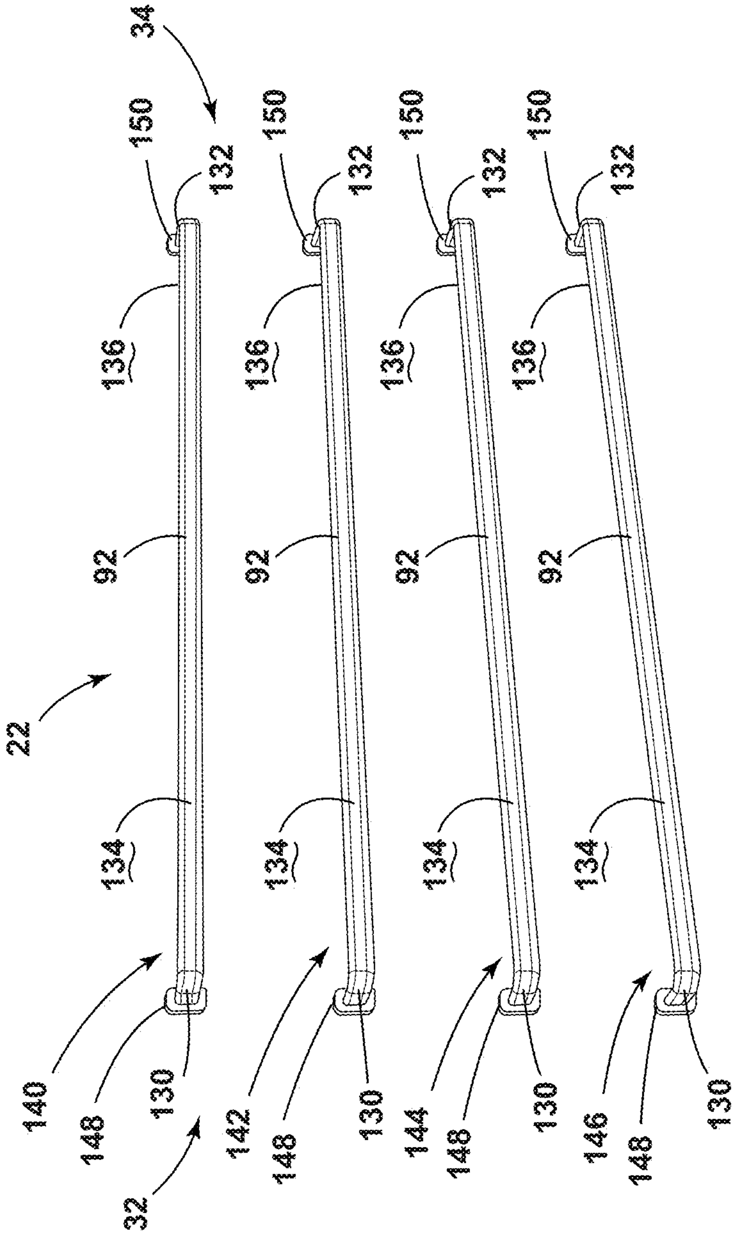
FIG. 9 is a side perspective view of the ladder rack assembly of FIG. 7 separated from the sidewall, according to the present disclosure.

Referring to FIGS. 7-9, an additional or alternative configuration of the ladder rack assembly 22 is illustrated. The ladder rack assembly 22 may include four single rack supports 140, 142, 144, 146 that are separately couplable to the sidewall 16. In such a configuration, the vertical rail 32 is configured as multiple front rail portions 148 and the vertical rail 34 is configured as multiple rear rail portions 150. The front rail portions 148 are horizontally aligned with the rear rail portions 150 to define the cooking levels. Each front rail portion 148 is vertically spaced from the adjacent front rail portions 148, and each rear rail portion 150 is vertically spaced from the adjacent rear rail portions 150. In such configurations, the ladder rack assembly 22 may be configured as four separate components.

The single rack support 142 includes the horizontal rack 24 extending between the respective front rail portion 148 and the respective rear rail portion 150. The single rack support 144 includes the horizontal rack 26 extending between the respective front rail portion 148 and the respective rear rail portion 150. Similarly, the single rack support 144 includes the horizontal rack 24 extending between the respective front rail portion 148 and the respective rear rail portion 150, and the single rack support 146 includes the horizontal rack 26 extending between the respective front rail portion 148 and the respective rear rail portion 150. Each of the horizontal racks 24, 26, 28, 30 is disposed at one of the cooking levels for supporting the cooking tray. The ladder rack assembly 22 having the four rack supports 140 may be positioned in the recessed region 18 similar to the ladder rack assembly 22 illustrated in FIGS. 1-6.

The front and rear rail portions 148, 150 are generally disposed adjacent to the opposing edges 104, 106 within the recessed region 18 of the sidewall 16. The front and rear rail portions 148, 150 have planar abutting surfaces 112 and planar inner surfaces 90. The front and rear rail portions 148, 150 are generally flush with the peripheral surface 20 surrounding the recessed region.

The front and rear rail portions 148, 150 generally have a height that is slightly greater than a height of the individual horizontal racks 24, 26, 28, 30. The rack supports 140, 142, 144, 146 having the short front and rear rail portions 148, 150, that do not extend substantially between adjacent horizontal racks 24, 26, 28, 30, may contribute to an appearance of the horizontal racks 24, 26, 28, 30 being integrally formed or integrated with the sidewall 16. Each of the front and rear rail portions 148, 150 may be coupled with the sidewall 16 in any of the manners described herein. The user may selectively and independently disengage each rack support 140, 142, 144, 146 from the sidewall 16.

Figure 10:
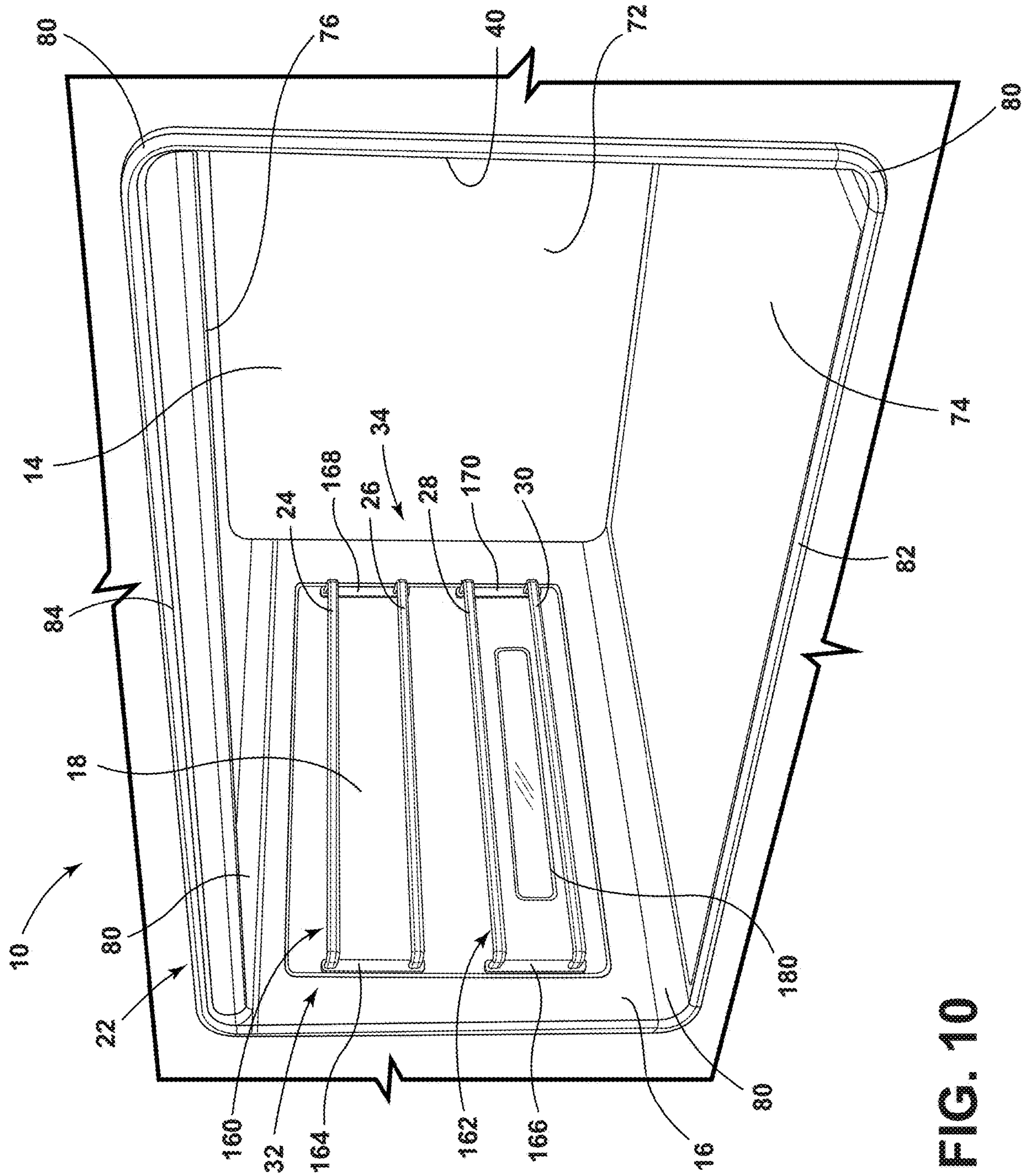
FIG. 10 is a side perspective view of a cooking cavity of a cooking appliance having a ladder rack assembly coupled to a sidewall, according to the present disclosure.
Figure 11:
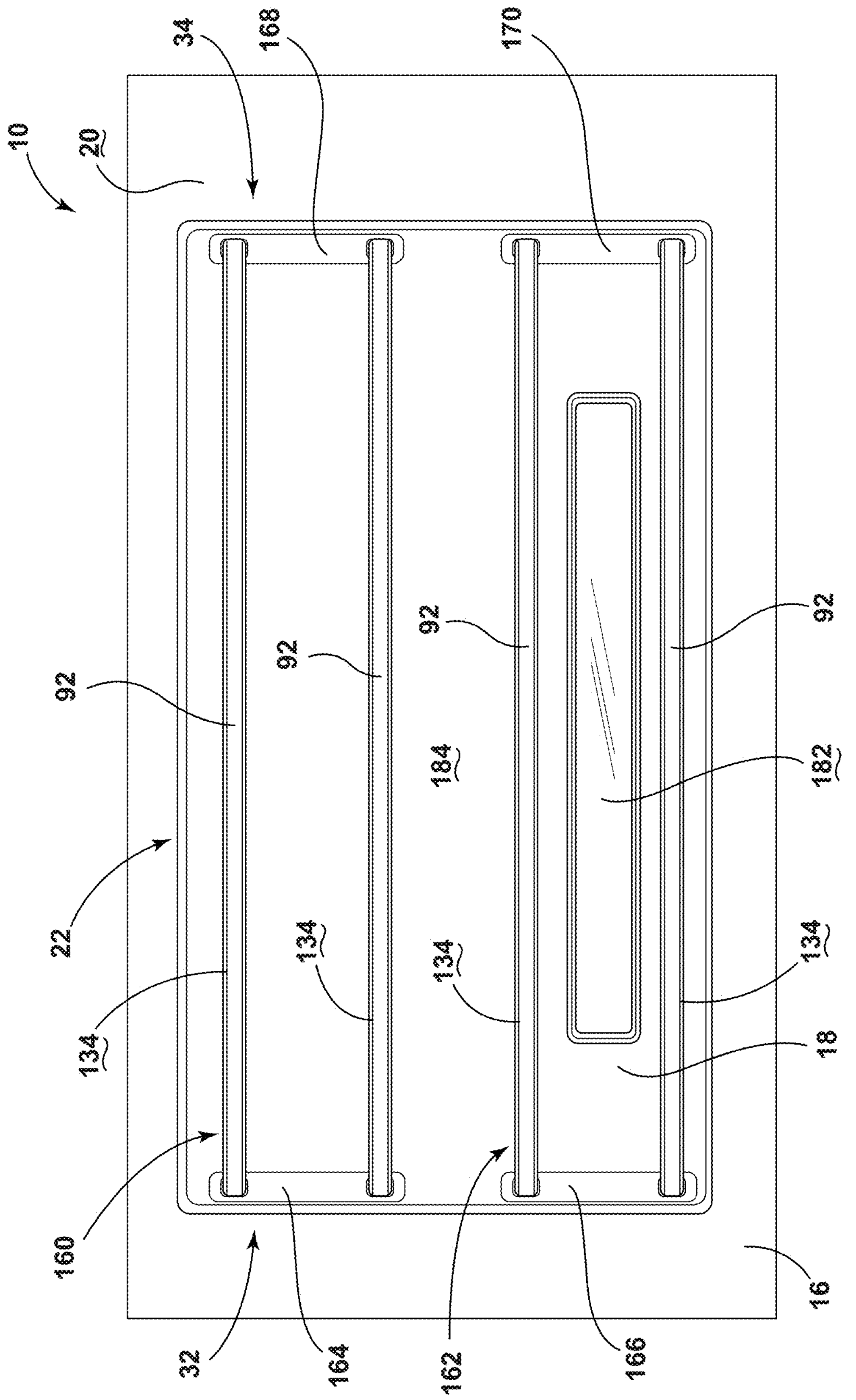
FIG. 11 is a front elevational view of the ladder rack assembly of FIG. 10 coupled to the sidewall within the cooking cavity, according to the present disclosure.
Figure 12:
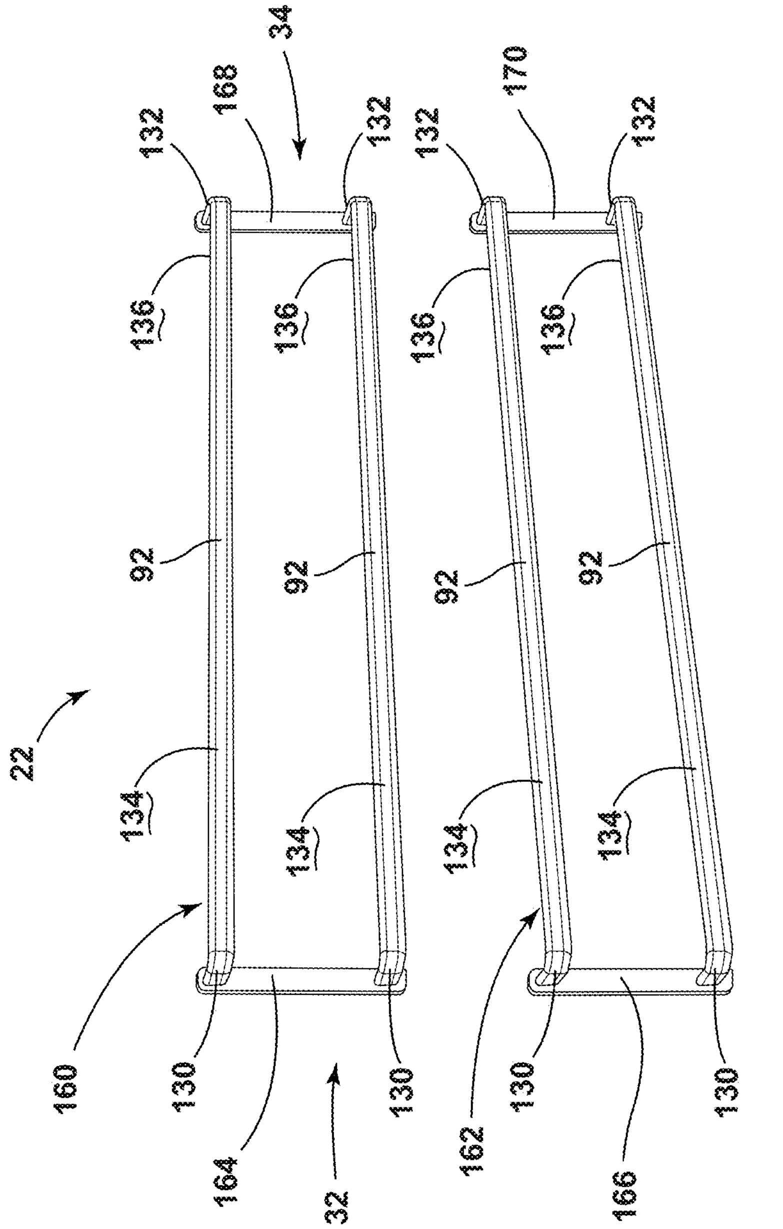
FIG. 12 is a side perspective view of the ladder rack assembly of FIG. 10, according to the present disclosure.

Referring to FIGS. 10-12, an additional or alternative configuration of the ladder rack assembly 22 is illustrated. The ladder rack assembly 22 includes two dual rack supports 160, 162. In such configurations, the vertical rail 32 is configured as a front upper rail portion 164 and a front lower rail portion 166, while the vertical rail 34 is configured as a rear upper rail portion 168 and a rear lower rail portion 170. The front upper rail portion 164 is vertically spaced from the front lower rail portion 166, and the rear upper rail portion 168 is vertically spaced from the rear lower rail portion 170. In such configurations, the ladder rack assembly 22 is configured as two separate components.

The first dual rack support 160 includes the horizontal racks 24, 26 extending between the upper rail portions 164, 168, and the second dual rack support 162 includes the horizontal racks 28, 30 extending between the lower rail portions 166, 170. Each dual rack support 160, 162 may be selectively and independently engaged and disengaged with the sidewall 16. The dual rack supports 160, 162 may be coupled to the sidewall 16 in any manner and using any method as described herein.

Referring to FIGS. 13 and 14, various cross-sectional shapes of the horizontal racks 24, 26, 28, 30 of the unitary ladder rack assembly 22, such as the ladder rack assembly 22 illustrated in FIGS. 1-6 are illustrated. It is contemplated that the horizontal racks 24, 26, 28, 30 of the four-piece ladder rack assembly 22, as illustrated in FIGS. 7-9, and the two-piece ladder rack assembly 22, as illustrated in FIGS. 10-12, may have the same or similar cross-sectional shapes without departing from the teachings herein. As best illustrated in FIG. 13, the horizontal racks 24, 26, 28, 30 may have a substantially rectangular cross-sectional shape. The horizontal racks 24, 26, 28, 30 have radiused edges, with the radii being variable depending on a desired aesthetic or specific configuration of the cooking appliance 10. As best illustrated in FIG. 14, the horizontal racks 24, 26, 28, 30 has a more oblong or oval cross-sectional shape, having larger upper and lower radii. The larger radii allows for easier cleaning of the ladder rack assembly 22 than the ladder rack assembly 22 with sharper edges (as in FIG. 13). Further, the larger radii may allow a more blending aesthetic between the ladder rack assembly 22 and the sidewall 16 (FIG. 1).

Referring to FIGS. 1-14, each configuration of the ladder rack assembly 22 may have a same general overall appearance for the horizontal racks 24, 26, 28, 30. The ladder rack assembly 22 may include single, elongate vertical rails 32, 34, or may have the vertical rails 32, 34 formed of multiple portions (e.g., the front and rear rail portions 148, 150, the upper and lower rail portions 164, 166, 168, 170, etc.).

The ladder rack assembly 22 may include any of a variety of materials. For example, one or more of the vertical rails 32, 34 and the horizontal racks 24, 26, 28, 30 may include a metal, such as steel or stainless steel. In certain aspects, the vertical rails 32, 34 include a microwave transparent material, such as ceramic and/or PTFE, and the horizontal racks 24, 26, 28, 30 include a metal, such as steel or stainless steel.

It is contemplated that one or more of the vertical rails 32, 34 and the horizontal racks 24, 26, 28, 30 may include an outer coating, such as chromium plating, acrylic enamel, PTFE, or ceramic. In additional or alternative non-limiting examples, one or more of the vertical rails 32, 34 and the horizontal racks 24, 26, 28, 30 may include a metal with a ceramic overlay. In a specific non-limiting example, the vertical rails 32, 34 may be constructed of a transparent material, PTFE, or ceramic, while the horizontal racks 24, 26, 28, 30 are constructed of chrome-plated steel or stainless steel. Such configurations of the ladder rack assembly 22 may be used with ovens that include pure steam functionality.

Additionally or alternatively, the sidewall 16 may be constructed of various materials, including stainless steel and/or an enamel coating. The ladder rack assembly 22 or a portion of the ladder rack assembly 22 may be constructed of the same material as the sidewall 16. Further, for a more integrated appearance, the ladder rack assembly 22 or a portion thereof may have a same finishing, including material and color, as the sidewall 16. In certain aspects, one or both of the sidewall 16 and the ladder rack assembly 22 may be, for example, dark chrome, bronze, warm chrome, or pale gold.

In specific examples, the vertical rails 32, 34 are constructed of ceramic and the horizontal racks 24, 26, 28, 30 are constructed of chrome-plated metal. The design of the ladder rack assembly 22 may provide for a variety of aesthetics in the cooking appliance 10. For example, the vertical rails 32, 34 may be the same color as the horizontal racks 24, 26, 28, 30. In other non-limiting examples, the vertical rails 32, 34 may be a different color than the horizontal racks 24, 26, 28, 30. In such configurations, either the vertical rails 32, 34 or the horizontal racks 24, 26, 28, 30 may be the same color as the sidewall 16. Each of the vertical rails 32, 34 and the horizontal racks 24, 26, 28, 30 may be matte or glossy. Further, each of the vertical rails 32, 34 and the horizontal racks 24, 26, 28, 30 white, black, brown, grey, or variations thereof. In additional non-limiting examples, each of the vertical rails 32, 34 and the horizontal racks 24, 26, 28, 30 may have a textured finish, such as a dotted gray to mirror a stone appearance. Further, in additional non-limiting examples, each of the vertical rails 32, 34 and the horizontal racks 24, 26, 28, 30 may have finishings that match with metallic finishings, such as bronze, gold, copper, silver, etc. The color of the ladder rack assembly 22 may result from a color of the materials, finishings, coatings, paints, etc. The ladder rack assembly 22 may vary in color and finishings to blend with the cooking cavity 14, match the cooking cavity 14, or be customized to the preference of the user.

Referring still to FIGS. 1-14, the cooking appliance 10 includes an elongated lighting assembly 180 disposed within the first sidewall 16. In the illustrated configuration, the elongated lighting assembly 180 is disposed proximal to a lower portion of the ladder rack assembly 22. The cooking appliance 10 may include multiple lighting assemblies 180. For example, one lighting assembly 180 may be disposed horizontally in a lower portion of the first sidewall 16 with a second lighting assembly 180 may be disposed horizontally within a lower portion of the second sidewall 40. The lighting assemblies 180 may also be disposed on upper portions of the sidewalls 16, 40 or elsewhere in the cooking cavity 14 without departing from the teachings herein. It is contemplated that each lighting assembly 180 may be substantially similar, or may be different depending on the location within the cooking cavity 14.

The lighting assembly 180 is generally disposed vertically between two horizontal racks 24, 26, 28, 30 of the ladder rack assembly 22 such that light may enter the cooking cavity 14 substantially unimpeded. A lighting surface 182 of the lighting assembly 180 may be flush with an interior surface 184 within the recessed region 18 of the first sidewall 16. Alternatively, the lighting surface 182 of the lighting assembly 180 may align with the inner surface 90 of the vertical rails 32, 34, such that the lighting assembly protrudes within the recessed region 18 but is generally co-planar with the peripheral surface 20 of the sidewall 16. The first sidewall 16 may include a first width and the elongated lighting assembly 180 may include a second width substantially equal to at least one-half of the first width. The elongated lighting assembly 180 may extend along substantially the entire width of the ladder rack assembly 22. Other configurations of the lighting assembly 180 are contemplated without departing from the teachings herein.

The lighting assembly 180 may include an optically translucent cover made from a suitable heat resistant material, such as borosilicate glass. The cover may serve as a light guide to diffuse or otherwise affect light provided by the elongated lighting assembly 180. The cover may be removable for ease of cleaning the cover of the elongated lighting assembly 180. The lighting assembly 180 may include one or more light-emitting diodes (LEDs). The LEDs may include an LED strip disposed within the elongated lighting assembly 180. The lighting assembly 180 may include a controller configured to operate the LEDs to have one or more predetermined behaviors (e.g., blinking, changing colors, changing brightness, etc.).

The lighting assembly 180 may generally emit visible light that has a wavelength in a range between about 380 nm and about 740 nm, or a mix of wavelengths in this range. The lighting assembly 180 may include any form of light source, for example, fluorescent lighting, LEDs, organic LEDs (OLEDs), polymer LEDs (PLEDs), laser diodes, quantum dot LEDs (OD-LEDs), solid-state lighting, a hybrid, and/or any other similar device. Any other form of lighting may be utilized within the cooking appliance 10 without departing from the teachings herein. Further, various types of LEDs are suitable for use as the lighting assembly 180, including, but not limited to, top-emitting LEDs, side-emitting LEDs, and others. According to various examples, multicolored light sources, such as Red, Green, and Blue (RGB) LEDs that employ red, green, and blue LED packaging may be used to generate various desired colors of light output from a single light source, according to known light color mixing techniques. Moreover, the lighting assembly 180 may be configured as a single light source, or alternatively, as more than one light source that can be selectively and independently controlled. Moreover, the lighting assembly 180 may emit any wavelength of light for illuminating the cooking cavity 14 without departing from the teachings herein.

Referring to FIGS. 15-18, an additional or alternative configuration of the sidewall 16 is illustrated. It is understood the sidewall 40 may have the same configuration. The sidewall 16 includes the recessed region 18 surrounded by the peripheral surface 20. Additionally, a front positioning groove 190 and a rear positioning groove 192. The positioning grooves 190, 192 are recessed from the interior surface 184 within the recessed region 18. In this way, the interior surface 184 is offset from the peripheral surface 20 by a first distance and a surface within each of the positioning grooves 190, 192 are offset from the interior surface 184 by a second distance, which is greater than the first distance.

Figure 15:
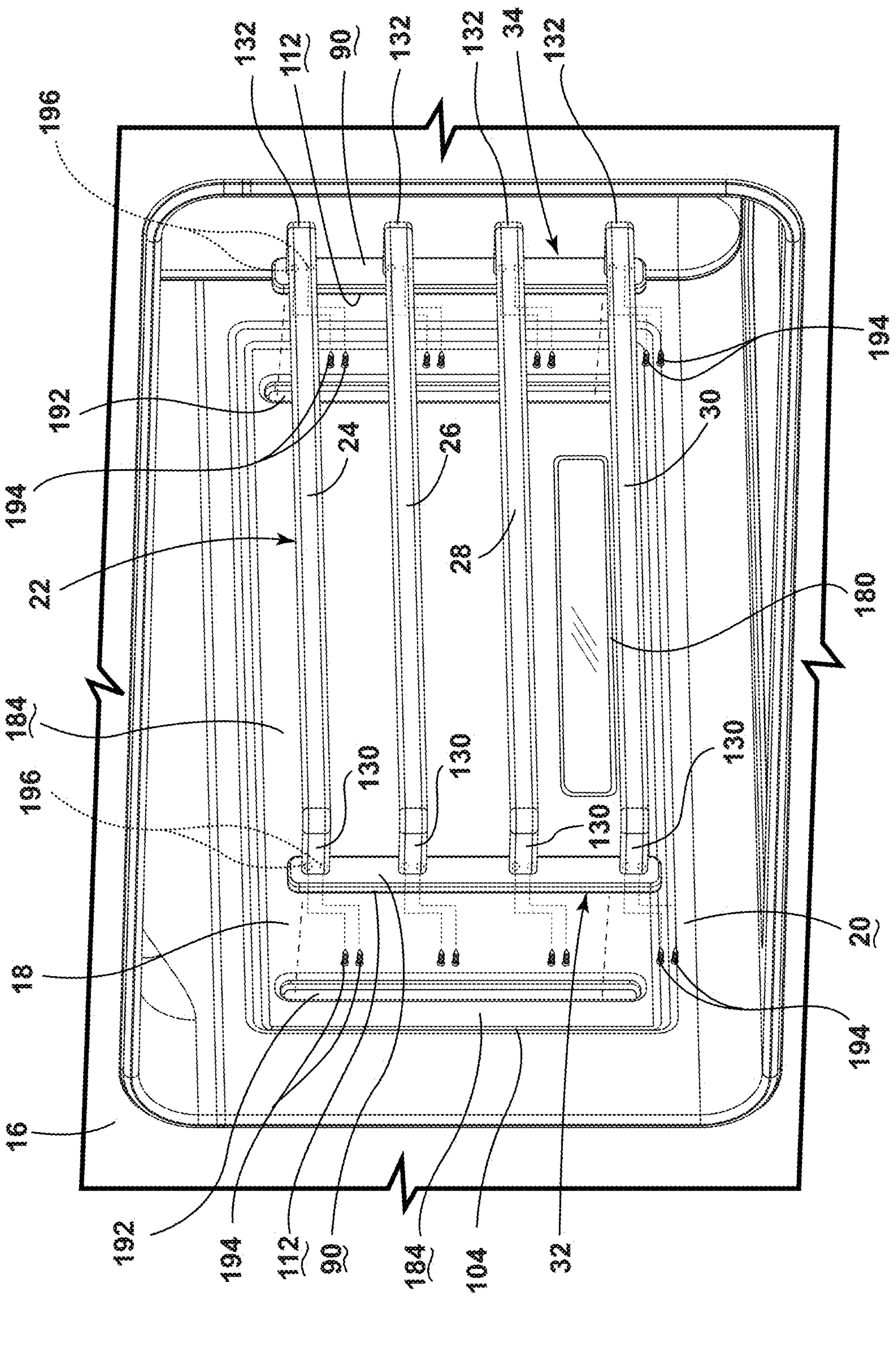
FIG. 15 is an exploded side perspective view of a ladder rack assembly and a sidewall having front and rear positioning grooves, according to the present disclosure.
Figure 16:
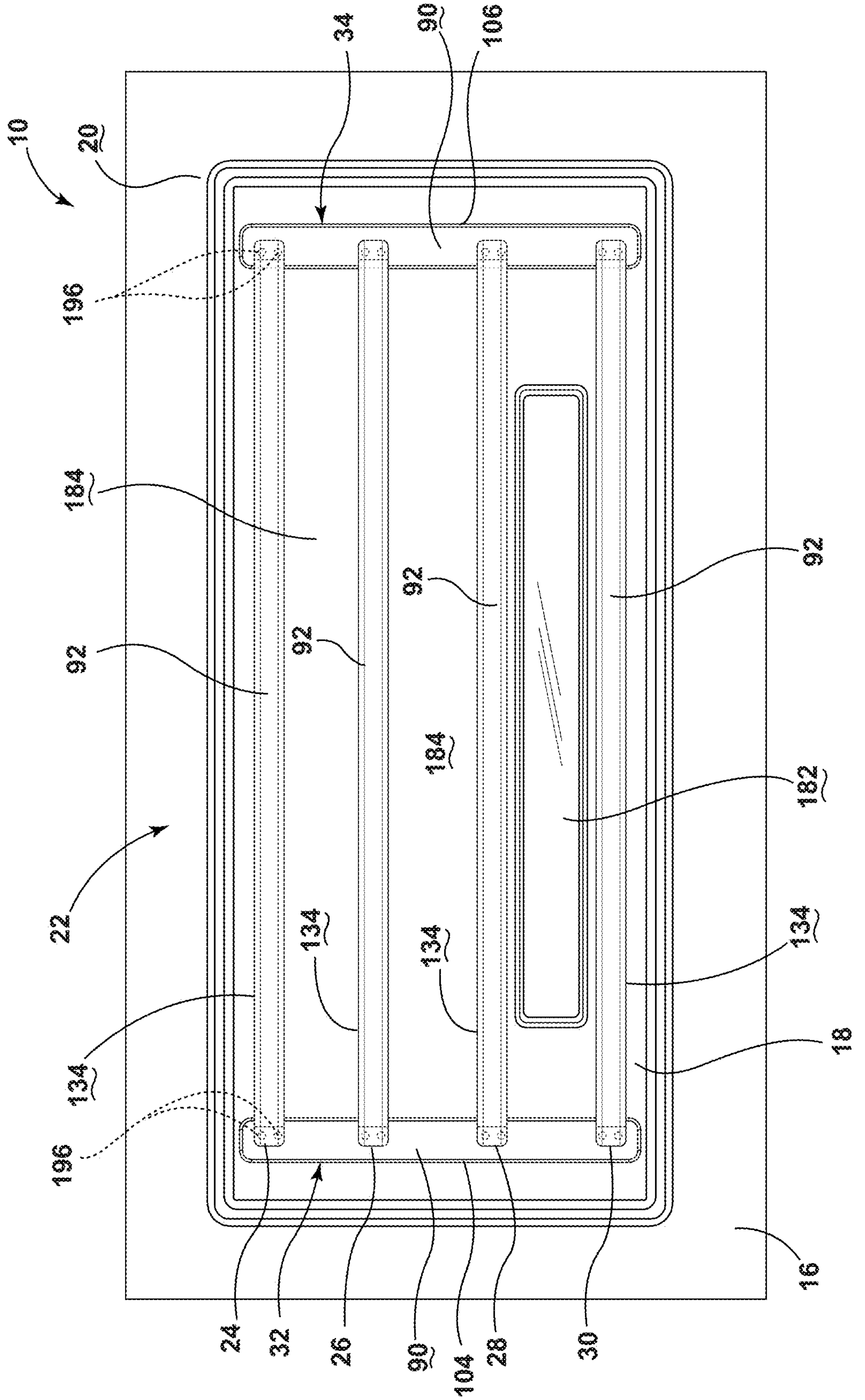
FIG. 16 is a front elevational view of the ladder rack assembly of FIG. 15 coupled to the sidewall, according to the present disclosure.

As best illustrated in FIGS. 15 and 16, the ladder rack assembly 22 having the two vertical rails 32, 34 is coupled to the sidewall 16. The positioning grooves 190, 192 are elongated, with a side and shape to receive the respective vertical rail 32, 34. When disposed within the positioning grooves 190, 192, the inner surfaces 90 of the vertical rails 32, 34 may be flush or coplar with the interior surface 184 of the recessed region 18. The vertical rails 32, 34 may then appear integrated with the interior surface 184.

Figure 17:
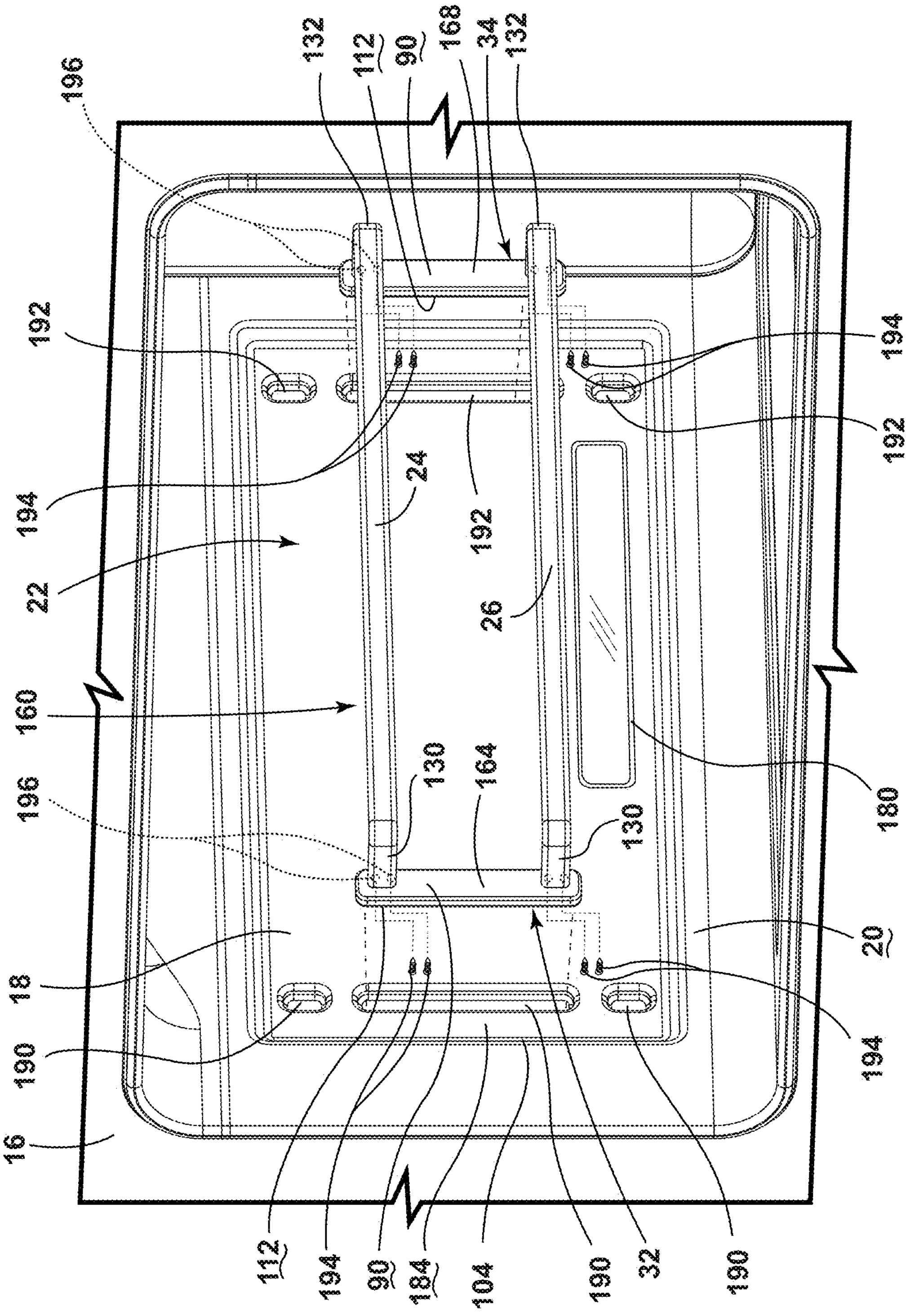
FIG. 17 is an exploded side perspective view of a ladder rack assembly with two rack supports and a sidewall having front and rear positioning grooves to receive the rack supports, according to the present disclosure.

As best illustrated in FIG. 17, the sidewall 16 may define multiple front positioning grooves 190 and multiple rear positioning grooves 192. The front positioning grooves 190 are generally vertically aligned with one another and horizontally aligned with the rear positioning grooves 192. The rear positioning grooves 192 are also vertically aligned with one another. At least one of each of the front and rear positioning grooves 190, 192 are sized and shaped to receive the upper rail portions 164, 168 and/or the lower rail portions 166, 170 of the dual rack supports 160, 162 of the ladder rack assembly 22.

In the illustrated configuration, one dual rack support 160 is coupled to the sidewall 16. Additional positioning grooves 190, 192 may be utilized for the single rack supports 140, 146. Alternatively, the sidewall 16 may define two front positioning grooves 190 and two rear positioning grooves 192 to couple both of the dual rack supports 160, 162 to the sidewall 16 without the single rack supports 146. When one or both of the dual rack supports 160, 162 coupled with the sidewall 16, the inner surfaces 90 of each of the upper rail portions 164, 168 and the lower rail portions 166, 170 are generally flush or coplanar with the interior surface 184 within the recessed region 18.

Figure 18:
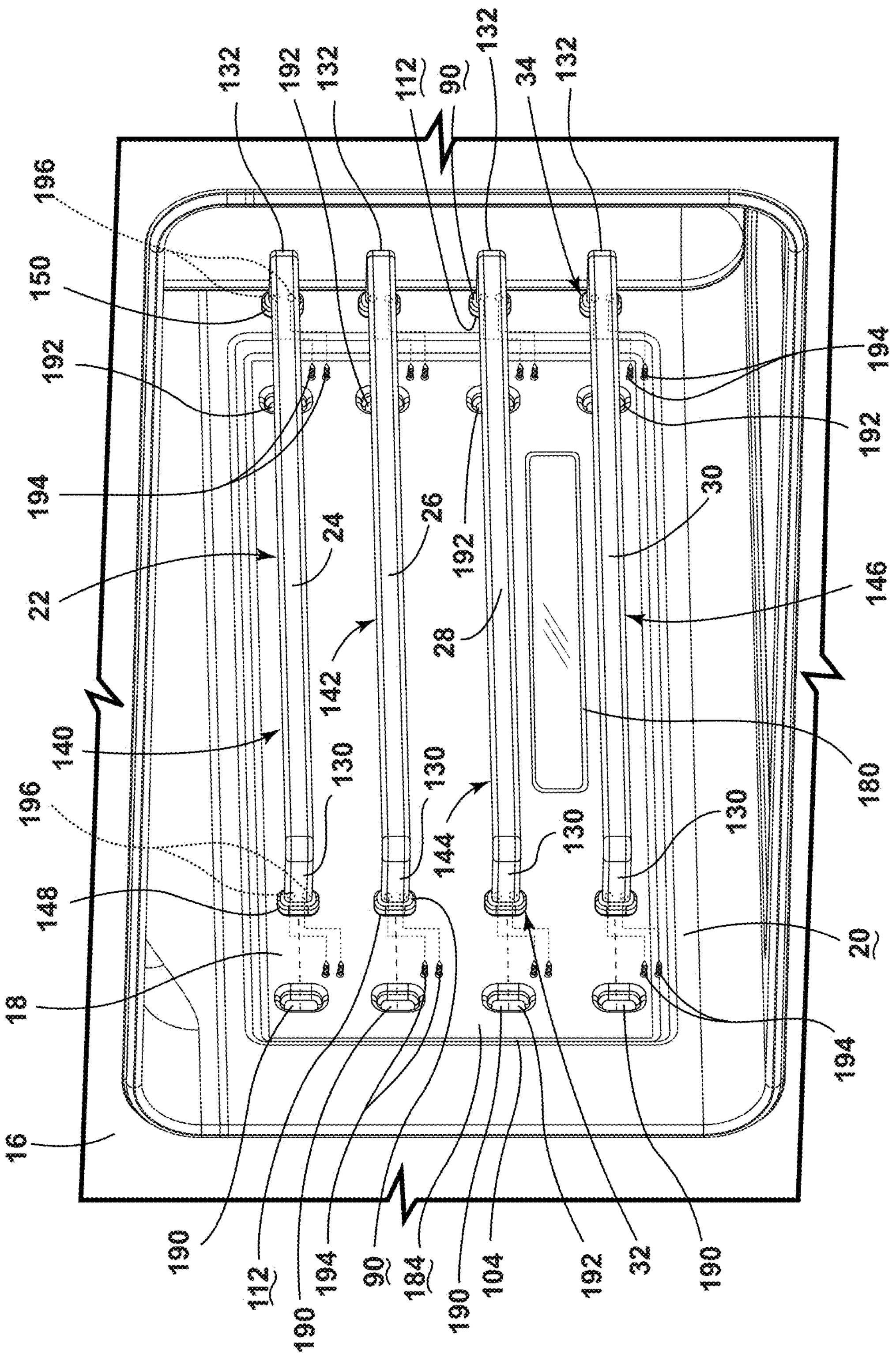
FIG. 18 is an exploded side perspective view of a ladder rack assembly having four rack supports and a sidewall having front and rear positioning grooves to receive the rack supports, according to the present disclosure.

As best illustrated in FIG. 18, the sidewall 16 may define four front positioning grooves 190 and four rear positioning grooves 192. The front positioning grooves 190 are vertically aligned with one another, and the rear positioning grooves 192 are vertically aligned with one another. The front positioning grooves 190 are horizontally aligned with the rear positioning grooves 192. The positioning grooves 190, 192 are sized and shaped to receive the front rail portions 148 and the rear rail portions 150, respectively, of the rack supports 140, 142, 144, 146 of the ladder rack assembly 22. When the rack supports 140, 142, 144, 146 are coupled with the sidewall 16, the front rail portions 148 are positioned in the front positioning grooves 190, and the rear rail portions 150 are positioned in the rear positioning grooves 192. Additionally, the inner surfaces 90 of the front and rear rail portions 148, 150 are generally flush or coplanar with the interior surface 184 of the recessed region 18.

In the examples illustrated in FIGS. 15-18, the the ladder rack assemblies 22 are generally fastened to the sidewall 16. Fasteners 194 engage both of the sidewall 16 and the ladder rack assembly 22. The ladder rack assemblies 22 generally define apertures 196 for receiving the fastener to couple the ladder rack assembly 22 to the sidewall 16. In the illustrated configuration, each two fasteners 194 are utilized for each engagement point between the sidewall 16 and the ladder rack assembly 22, however, any practicable number of fasteners 194 may be utilized without departing from the teachings herein.

Referring still to FIGS. 1-18, in operation, the latch assembly 52 may be used to open the door assembly 46 of the cooking appliance 10 to provide access to the cooking cavity 14 therein. The lighting assembly 180 may provide a desired illumination to the cooking cavity 14 before, during, and/or after operation of the cooking appliance 10. One or more cooking trays may be positioned on the ladder rack assembly 22 at a desired cooking level or height to support food items to be heated. The food items may be placed on the cooking tray and the door assembly 46 may be closed. The cooking appliance 10 may be operated using the control panel 60. When the food items are heated a desired amount, the operation of the cooking appliance 10 may cease and the door assembly 46 may be opened (e.g., via the latch assembly 52) such that the heated food items may be removed from the cooking cavity 14.

The user may clean the sidewalls 16, 40 with the ladder rack assemblies 22, 100 coupled thereto. The user may also remove the ladder rack assemblies 22, 100 from the cooking cavity 14, for example, for cleaning the cooking cavity 14 or the ladder rack assemblies 22, 100. The ladder rack assemblies 22, 100 may be disengaged from the respective sidewall 16, 40. The user may then recouple the ladder rack assemblies 22, 100 to the sidewalls 16, 40. The method of recoupling the ladder rack assemblies 22, 100 may depend on the configurations of the cooking appliance 10.

The ladder rack assemblies 22, 100 are disposed partially within the space defined by the recessed region 18 such that the vertical rails 32, 34 do not extend further into the cooking cavity 14 than the peripheral surface 20. The interior surface 184 is offset from the peripheral surface 20 by a predefined depth d, which may be substantially equal to the depth of the vertical rails 32, 34. This configuration provides for a substantially flush and integrated appearance of the sidewalls 16, 40 and the ladder rack assemblies 22, 100. The horizontal racks 24, 26, 28, 30 extend out of the space defined by the recessed region 18, and further into the cooking cavity 14 relative to the vertical rails 32, 34, to support the cooking trays.

Use of the present device may provide for a variety of advantages. For example, the ladder rack assembly 22 may be a single unitary piece, as illustrated in FIGS. 1-6, four single rack supports 140, 142, 144, 146, as illustrated in FIGS. 7-9, or two dual rack supports 160, 162, as illustrated in FIGS. 10-12. Further, each configuration of the ladder rack assembly 22 may include multiple horizontal racks 24, 26, 28, 30 that define multiple cooking levels within the cooking cavity 14 to support cooking trays. Additionally, the vertical rails 32, 34 may be entirely disposed within a space defined by the recessed regions 18 of the sidewalls 16, 40, respectively. In this way, the inner surfaces 90 of the vertical rails 32, 34 is substantially flush and coplanar with the peripheral surfaces 20 surrounding the recessed regions 18. Moreover, the flush or coplanar arrangement between the peripheral surfaces 20 or the interior surface 184 and the respective inner surfaces 90 of the vertical rails 32, 34 provides an integrated appearance. Additionally, this flush or coplanar arrangement provides for better alignment between the ladder rack assemblies 22, 100 and the respective sidewalls 16, 40. Also, the ladder rack assemblies 22, 100 may be conveniently installed and removed from the cooking cavity 14 by the user. Further, the materials and/or finishings of the ladder rack assembly 22, 100 may provide for a variety of aesthetic options for the user. Each configuration of the ladder rack assemblies 22, 100 may be used in any practicable cooking appliance 10 having a cooking cavity 14. Additional benefits or advantages may be realized and/or achieved.

The device disclosed herein is further summarized in the following paragraphs and is further characterized by combinations of any and all of the various aspects described therein.

According to an aspect of the present disclosure, a cooking appliance including a cabinet defining a cooking cavity. The cooking cavity is defined by at least one sidewall. The at least one sidewall defines a recessed region surrounded by a peripheral surface. A ladder rack assembly is disposed within the cooking cavity. The ladder rack assembly includes a horizontal rack defining a cooking level and a vertical rail coupled to the horizontal rack and coupled to the at least one sidewall within the recessed region. The vertical rail is flush with the peripheral surface of the at least one sidewall.

According to an aspect of the present disclosure, a horizontal rack is integrally formed with a vertical rail such that a ladder rack assembly is a single unitary component.

According to an aspect of the present disclosure, a ladder rack assembly is at least partially constructed of a microwave transparent material.

According to an aspect of the present disclosure, a microwave transparent material includes at least one of ceramic and polytetrafluoroethylene.

According to an aspect of the present disclosure, a horizontal rack is constructed of chrome-plated steel.

According to an aspect of the present disclosure, a horizontal rack is constructed of stainless steel.

According to an aspect of the present disclosure, a vertical rail is disposed within a space defined by a recessed region and a horizontal rack extends out of the space and further into a cooking cavity relative to the vertical rail.

According to an aspect of the present disclosure, a ladder rack assembly for a cooking appliance includes a wall defining a recessed region adjacent to a peripheral surface. An interior surface of the recessed region is offset from the peripheral surface by a predefined depth. A ladder rack is coupled to the interior surface in the recessed region. The ladder rack includes a first vertical rail disposed proximate a first edge of the recessed region, a second vertical rail disposed proximate a second edge of the recessed region, and at least one horizontal rack extending between the first vertical rail and the second vertical rail. The first vertical rail and the second vertical rail are disposed within a space defined by the recessed region and the at least one horizontal rack extends out of the space.

According to an aspect of the present disclosure, an inner surface of each of a first vertical rail and a second vertical rail is coplanar with a peripheral surface.

According to an aspect of the present disclosure, a central guide portion of the at least one horizontal rack defines a rectangular cross-sectional shape.

According to an aspect of the present disclosure, at least one horizontal rack includes multiple horizontal racks in a spaced apart configuration along a length of each of a first vertical rail and a second vertical rail.

According to an aspect of the present disclosure, a first vertical rail includes multiple front rail portions, a second vertical rail includes multiple rear rail portions, and at least one horizontal rack includes multiple horizontal racks, wherein each horizontal rack extends between one of the front rail portions and one of the rear rail portions.

According to an aspect of the present disclosure, each front rail portion is vertically spaced from an adjacent front rail portion and each rear rail portion is vertically spaced from an adjacent rear rail portion.

According to an aspect of the present disclosure, a first vertical rail includes a front upper rail portion spaced from a front lower rail portion and a second vertical rail includes a rear upper rail portion spaced from a rear lower rail portion.

According to an aspect of the present disclosure, at least one horizontal rack includes two horizontal racks extending between a front upper rail portion and a rear upper rail portion and two horizontal racks extending between a front lower rail portion and a rear lower rail portion.

According to an aspect of the present disclosure, a ladder rack assembly for a cooking appliance including a first vertical rail and a second vertical rail spaced from the first vertical rail. Each of the first vertical rail and the second vertical rail has a planar inner surface configured to be oriented toward a cooking cavity of said cooking appliance. Horizontal racks are coupled to the planar inner surfaces and extend between the first vertical rail and the second vertical rail. Each horizontal rack has a rectangular cross-sectional shape.

According to an aspect of the present disclosure, a first vertical rail includes multiple front rail portions in a spaced apart configuration and a second vertical rail includes multiple rear rail portions horizontally aligned with the front rail portions.

According to an aspect of the present disclosure, front rail portions align with rear rail portions to define cooking levels, wherein one horizontal rack is disposed at each cooking level.

According to an aspect of the present disclosure, a first vertical rail includes a front upper rail portion spaced from a front lower rail portion, wherein a rear vertical rail includes a rear upper rail portion spaced from a rear lower rail portion.

According to an aspect of the present disclosure, two horizontal racks extend between a front upper rail portion and a rear upper rail portion and two horizontal racks extend between a front lower rail portion and a rear lower rail portion.

The embodiments described above are only intended to describe the preferred embodiments of the present device, and are not intended to limit the scope of the present device, and various embodiments of the present device may be made by those skilled in the art without departing from the spirit of the device. Modifications and improvements are intended to fall within the scope of the device as defined by the appended claims.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:

a cabinet defining a cooking cavity, wherein the cooking cavity is defined by at least one sidewall, wherein the at least one sidewall defines a recessed region surrounded by a peripheral surface; and a ladder rack assembly disposed within the cooking cavity, wherein the ladder rack assembly includes:

a horizontal rack defining a cooking level; and a vertical rail coupled to the horizontal rack and coupled to the at least one sidewall within the recessed region, wherein the vertical rail is disposed between upper and lower edges of the recessed region with an abutting surface abutting the at least one sidewall and an inner surface flush with the peripheral surface of the at least one sidewall, and wherein the ladder rack defines at least one aperture at a junction between the horizontal rack and the vertical rail for receiving a fastener to couple the ladder rack assembly to the at least one sidewall.

2. The cooking appliance of claim 1, wherein the horizontal rack is integrally formed with the vertical rail such that the ladder rack assembly is a single unitary component.

3. The cooking appliance of claim 1, wherein the ladder rack assembly is at least partially constructed of a microwave transparent material.

4. The cooking appliance of claim 3, wherein the microwave transparent material includes at least one of ceramic and polytetrafluoroethylene.

5. The cooking appliance of claim 1, wherein the horizontal rack is constructed of chrome-plated steel.

6. The cooking appliance of claim 1, wherein the horizontal rack is constructed of stainless steel.

7. The cooking appliance of claim 1, wherein the vertical rail is disposed within a space defined by the recessed region and the horizontal rack extends out of the space and further into the cooking cavity relative to the vertical rail.

8. A ladder rack assembly for a cooking appliance, comprising:
- a wall defining a recessed region adjacent to a peripheral surface, wherein an interior surface of the recessed region is offset from the peripheral surface by a first predefined depth, and wherein at least one front positioning groove and at least one rear positioning grooves are defined within the recessed region, and further wherein the at least one front positioning groove and the at least one rear positioning groove are offset from the peripheral surface by a second predefined depth greater than the first predefined depth; and
- a ladder rack coupled to the interior surface in the recessed region, wherein the ladder rack includes:
  - a first vertical rail disposed in the at least one front positioning groove proximate a first edge of the recessed region with an inner surface flush with the interior surface of the recessed region;
  - a second vertical rail disposed in the at least one rear positioning groove proximate a second edge of the recessed region with an inner surface flush with the interior surface of the recessed region; and
  - at least one horizontal rack extending between the first vertical rail and the second vertical rail, wherein the first vertical rail and the second vertical rail are disposed within a space defined by the recessed region and the at least one horizontal rack extends out of the space.

9. The ladder rack assembly of claim 8, wherein a central guide portion of the at least one horizontal rack defines a rectangular cross-sectional shape.

10. The ladder rack assembly of claim 8, wherein the at least one horizontal rack includes multiple horizontal racks in a spaced apart configuration along a length of each of the first vertical rail and the second vertical rail.

11. The ladder rack assembly of claim 8, wherein the first vertical rail includes multiple front rail portions, the second vertical rail includes multiple rear rail portions, and the at least one horizontal rack includes multiple horizontal racks, wherein each horizontal rack extends between one of the front rail portions and one of the rear rail portions.

12. The ladder rack assembly of claim 11, wherein each of the front rail portions are vertically spaced from an adjacent front rail portion and each of the rear rail portions is vertically spaced from an adjacent rear rail portion.

13. The ladder rack assembly of claim 8, wherein the first vertical rail includes a front upper rail portion spaced from a front lower rail portion and the second vertical rail includes a rear upper rail portion spaced from a rear lower rail portion.

14. The ladder rack assembly of claim 13, wherein the at least one horizontal rack includes two horizontal racks extending between the front upper rail portion and the rear upper rail portion and two horizontal racks extending between the front lower rail portion and the rear lower rail portion.

15. The ladder rack assembly of claim 13, wherein the at least one front positioning groove includes an upper front positioning groove in which the front upper rail portion is positioned and a lower front positioning groove in which the lower front rail portion is positioned, and wherein the at least one rear positioning groove includes an upper rear positioning groove in which the rear upper rail portion is positioned and a lower rear positioning groove in which the lower rear rail portion is positioned.

* * * * *